(12) United States Patent
Zhao et al.

(10) Patent No.: US 10,412,019 B2
(45) Date of Patent: Sep. 10, 2019

(54) PATH COMPUTATION ELEMENT CENTRAL CONTROLLERS (PCECCS) FOR NETWORK SERVICES

(71) Applicant: Futurewei Technologies, Inc., Plano, TX (US)

(72) Inventors: Qianglin Quintin Zhao, Boxborough, MA (US); Renwei Li, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 249 days.

(21) Appl. No.: 15/201,195

(22) Filed: Jul. 1, 2016

(65) Prior Publication Data

US 2017/0012895 A1   Jan. 12, 2017

Related U.S. Application Data

(60) Provisional application No. 62/188,920, filed on Jul. 6, 2015, provisional application No. 62/188,929, filed
(Continued)

(51) Int. Cl.
*H04L 12/913* (2013.01)
*H04L 12/721* (2013.01)
(Continued)

(52) U.S. Cl.
CPC ............ *H04L 47/724* (2013.01); *H04L 45/38* (2013.01); *H04L 45/507* (2013.01);
(Continued)

(58) Field of Classification Search
CPC ..... H04L 47/724; H04L 45/507; H04L 45/38; H04L 45/741
See application file for complete search history.

(56) References Cited

U.S. PATENT DOCUMENTS 6,374,303 B1 * 4/2002 Armitage ................ H04L 45/00
370/390
8,953,500 B1 * 2/2015 Shen ....................... H04L 45/16
370/238
(Continued)

FOREIGN PATENT DOCUMENTS

CN          103354988 A       10/2013
CN          104067574 A        9/2014
(Continued)

OTHER PUBLICATIONS

Crabbe, E., et al., "PCEP Extensions for PCE-initiated LSP Setup in a Stateful PCE Model draft-ietf-pce-pce-initiated-lsp-05," PCE Working Group, Standards Track, Oct. 19, 2015, 17 pages.
(Continued)

*Primary Examiner* — Kevin C. Harper
(74) *Attorney, Agent, or Firm* — Conley Rose, P.C.

(57) ABSTRACT

A method implemented by a path computation element centralized controller (PCECC), the method comprises: receiving a service request to provision for a service from a first edge node and a second edge node in a network; computing a path for a label switched path (LSP) from the first edge node to the second edge node in response to the service request; reserving label information for forwarding traffic of the service on the LSP; and sending a label update message to a third node on the path to facilitate forwarding of the traffic of the service on the path, wherein the label update message comprises the label information.

21 Claims, 12 Drawing Sheets

Related U.S. Application Data on Jul. 6, 2015, provisional application No. 62/188,933, filed on Jul. 6, 2015.

(51) Int. Cl.

| | | |
|---|---|---|
| *H04L 12/723* | (2013.01) | |
| *H04L 12/749* | (2013.01) | |
| *H04L 12/46* | (2006.01) | |
| *H04L 29/06* | (2006.01) | |
| *H04L 12/715* | (2013.01) | |
| *H04L 12/717* | (2013.01) | |
| *H04L 12/741* | (2013.01) | |

(52) U.S. Cl.
CPC ........ *H04L 45/741* (2013.01); *H04L 12/4641* (2013.01); *H04L 45/42* (2013.01); *H04L 45/50* (2013.01); *H04L 45/54* (2013.01); *H04L 45/64* (2013.01); *H04L 45/68* (2013.01); *H04L 63/0272* (2013.01)

(56) References Cited

U.S. PATENT DOCUMENTS

| | | | | |
|---|---|---|---|---|
| 9,178,809 | B1* | 11/2015 | Shen | H04L 12/4633 |
| 2003/0012189 | A1* | 1/2003 | Nomura | H04L 45/02 370/389 |
| 2003/0088699 | A1* | 5/2003 | Luciani | H04L 12/4641 709/243 |
| 2005/0286558 | A1* | 12/2005 | Ould-Brahim | H04L 12/4633 370/467 |
| 2006/0168279 | A1 | 7/2006 | Lee et al. | |
| 2007/0133406 | A1 | 6/2007 | Vasseur | |
| 2009/0310482 | A1* | 12/2009 | Asaie | G06F 11/1443 370/225 |
| 2009/0316695 | A1* | 12/2009 | Li | H04L 12/2859 370/389 |
| 2010/0177774 | A1 | 7/2010 | Hart et al. | |
| 2010/0208733 | A1 | 8/2010 | Zhao et al. | |
| 2012/0195229 | A1 | 8/2012 | Chen | |
| 2012/0281539 | A1* | 11/2012 | Patel | H04L 45/026 370/241 |
| 2013/0070752 | A1 | 3/2013 | Dhruv et al. | |
| 2013/0227156 | A1 | 8/2013 | Pirbhai et al. | |
| 2013/0266006 | A1 | 10/2013 | Dutta et al. | |
| 2015/0103844 | A1 | 4/2015 | Zhao et al. | |
| 2015/0131668 | A1* | 5/2015 | Kumar | H04L 45/30 370/395.5 |

FOREIGN PATENT DOCUMENTS

| | | | |
|---|---|---|---|
| JP | 2006129359 A | 5/2006 | |
| JP | 2006211661 A | 8/2006 | |
| JP | 2012514928 A | 6/2012 | |
| JP | 2013535909 A | 9/2013 | |
| WO | 2013149675 A1 | 10/2013 | |
| WO | 2015043681 A1 | 4/2015 | |

OTHER PUBLICATIONS

Crabbe, E., et al., "PCEP Extensions for Stateful PCE draft-ietf-pce-stateful-pce-09," PCE Working Group, Standards Track, Mar. 20, 2016, 51 pages.

Vasseur, JP., Ed., et al., "Path Computation Element (PCE) Communication Protocol (PCEP)," Network Working Group, RFC 5440, Standards Track, Mar. 2009, 87 pages.

Zhao, Q., et al., "PCEP Procedures and Protocol Extensions for Using PCE as a Central Controller (PCECC) of LSPs draft-zhao-pce-pcep-extension-for-pce-controller-03," Mar. 16, 2016, 36 pages.

Zhao, Q., et al., "The Use Cases for Using PCE as the Central Controller (PCECC) of LSPs draft-zhao-teas-pcecc-use-cases-00," TEAS Work Group, Mar. 17, 2016, 23 pages.

Zhao, Q., et al., "The Use Cases for Using PCE as the Central Controller (PCECC) of LSPs," draft-zhao-pce-central-controller-user-cases-01, Jul. 4, 2014, 24 pages.

Foreign Communication From a Counterpart Application, PCT Application No. PCT/CN2016/088389, International Search Report dated Oct. 10, 2016, 4 pages.

Zhao, Q., et al., "PCEP Procedures and Protocol Extensions for Using PCE as a Central Controller (PCECC) of LSPs," draft-zhao-pce-pcep-extension-for-pce-controller-01, Mar. 2, 2015, 30 pages.

Martini, L., Ed., et al., "Encapsulation Methods for Transport of Frame Relay over Multiprotocol Label Switching (MPLS) Networks," RFC 4619, Sep. 2006, 20 pages.

Foreign Communication From a Counterpart Application, European Application No. 16820808.0, Extended European Search Report dated Apr. 30, 2018, 16 pages.

Machine Translation and Abstract of Japanese Publication No. JP2006129359, May 18, 2006, 26 pages.

Bryant, S., Ed., "Pseudo Wire Emulation Edge-to-Edge (PWE3) Architecture," RFC 3985, Mar. 2005, 42 pages.

Foreign Communication From a Counterpart Application, Japanese Application No. 2018-500311, Japanese Office Action dated Mar. 11, 2019, 7 pages.

Foreign Communication From a Counterpart Application, Japanese Application No. 2018-500311, English Translation of Japanese Office Action dated Mar. 11, 2019, 9 pages.

Foreign Communication From a Counterpart Application, Korean Application No. 10-2017-7037933, Korean Office Action dated Apr. 1, 2019, 5 pages.

Foreign Communication From a Counterpart Application, Korean Application No. 10-2017-7037933, English Translation of Korean Office Action dated Apr. 1, 2019, 3 pages.

\* cited by examiner

PATH COMPUTATION ELEMENT CENTRAL CONTROLLERS (PCECCS) FOR NETWORK SERVICES

CROSS-REFERENCE TO RELATED APPLICATIONS

This application claims priority to U.S. provisional patent application No. 62/188,920 filed Jul. 6, 2015 by Qianglin Quintin Zhao, et al., and titled "Using PCE as the Central Controller for VPN," U.S. provisional patent application No. 62/188,929 filed Jul. 6, 2015 by Qianglin Quintin Zhao, et al., and titled "Using PCE as the Central Controller for IPv6," and U.S. provisional patent application No. 62/188,933 filed Jul. 6, 2015 by Renwei Li, et al., and titled "Using PCE as the Central Controller for PWE3," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multiprotocol label, switching (MPLS) networks are widely deployed in service provider networks. Current MPLS networks are difficult to operate and maintain due to their use of label distribution protocol (LDP) and resource reservation protocol (RSVP)-traffic engineering (TE) (RSVP-TE) MPLS signaling protocols. In addition, each network device in an MPLS network needs to maintain a large amount of states for established label switched paths (LSPs). Further, new services may not be easily added to existing MPLS networks.

Software defined networking (SDN) is a networking architecture that decouples the control plane from the data plane. That decoupling allows for centralization of network control, enabling effective policy administration and flexible management. The centralization of network control facilitates various network functionalities such as network measurements, traffic engineering, enhanced quality of services, and enhanced access control. In addition, new services may be easily added to SDN-based networks. Thus, service providers may benefit from the SDN architecture.

An example SDN network is an OpenFlow network. OpenFlow provides a common communication protocol between SDN controllers and network nodes. The OpenFlow protocol describes messages exchanged between an OpenFlow controller and OpenFlow switches, where the OpenFlow controller programs the OpenFlow switches with flow forwarding entries for data forwarding.

SUMMARY

Although OpenFlow networks may allow for greater flexibility and efficiency, the deployment of OpenFlow networks may not be practical. For example, to migrate an existing network to an OpenFlow SDN network, all network devices in the network are required to be replaced or upgraded to software programmable devices that support SDN functionalities. One approach to providing a practical SDN-based network with good performance and application-oriented services is to employ source routing (SR)-based segment routing. However, the SR-based segment routing approach may be limited to providing partial services. Another approach is to employ a combination of a stateful path computation element (PCE) and a distributed MPLS architecture. However, the deployment and maintenance complexity of MPLS remains. To resolve these and other problems, and as will be more fully explained herein, a path computation element central controller (PCECC) is used to compute paths and reserve or allocate labels for services according to requests from users, customers, and applications. The PCECC downloads forwarding instructions to all network nodes in a network. Thus, the network nodes are not required to employ LDP and RSVP-TE MPLS signaling protocols, maintain LSP states, or exchange interior gateway protocol (IGP) labels and internal border gateway protocol (IBGP) labels.

In one embodiment, the disclosure includes a method implemented by a path computation element centralized controller (PCECC), the method comprising: receiving a service request to provision for a service from a first edge node and a second edge node in a network; computing a path for a label switched path (LSP) from the first edge node to the second edge node in response to the service request; reserving label information for forwarding traffic of the service on the LSP; and sending a label update message to a third node on the path to facilitate forwarding of the traffic of the service on the path, wherein the label update message comprises the label information. In some embodiments, the service is a virtual private network (VPN) service, and wherein the label information comprises a VPN label for identifying the VPN service in the network; the VPN label comprises a VPN number, a VPN name, or both the VPN number and the VPN name; the service is a pseudowire emulation edge-to-edge (PWE3) service, and wherein the label information comprises a data link layer connection identifier (DLCI) label for identifying the PWE3 service in the network; the DLCI label comprises a DLCI number, a DLCI name, or both the DLCI number and the DLCI name; the service is an Internet Protocol version 6 (IPv6) tunneling service, and wherein the label information comprises an IPv6 address type-length-value (TLV) indicating an IPv6 address associated with a next hop node of the third node on the path and an outgoing label for forwarding the traffic of the service to the next hop node; the service is an Internet Protocol version 6 (IPv6) tunneling service, and wherein the label information comprises an IPv6 address type-length-value (TLV) indicating an IPv6 address associated with an incoming interface of the third node and an incoming label associated with the incoming interface; reserving the label information comprises reserving a path label for each of a plurality of SDN-enabled nodes on the path of the LSP to facilitate forwarding of the traffic of the service, and wherein the third node is one of the SDN-enabled nodes; the method further comprises: receiving, from a non-SDN-enabled node on the path, a label range reservation request message requesting a range of path label values; reserving the range for the non-SDN-enabled node; and sending, to the non-SDN-enabled node, a label range reservation response message indicating the range of path label values reserved; the label update message is a path computation element communication (PCE) communication protocol (PCEP) label update (PCLabelUp) message.

In another embodiment, the disclosure includes a path computation element centralized controller (PCECC) comprising: a receiver configured to receive a request to create a service from a first edge node to a second edge node in a network; a processor coupled to the receiver and configured to: compute a path for a label switched path (LSP) from the first edge node to the second edge node in response to the request; and reserve label information for forwarding traffic of the service on the LSP; and a transmitter coupled to the processor and configured to send a label update message to a third node on the path to facilitate forwarding of the traffic of the service on the path, wherein the label update message comprises the label information. In some embodiments, the service is a virtual private network (VPN) service, and wherein the label information comprises a VPN label for identifying the VPN service in the network; the service is a pseudowire emulation edge-to-edge (PWE3) service, and wherein the label information comprises a data link layer connection identifier (DLCI) label for identifying the PWE3 service in the network; the service is an Internet Protocol version 6 (IPv6) tunneling service, and wherein the label update message further comprises an IPv6 address of an egress node of the LSP; the PCECC further comprises a memory coupled to the processor and configured to store a traffic engineering database (TEDB) comprising topology information of the network, wherein the processor is further configured to compute the path according to the topology information in the TEDB; the PCECC further comprises a memory coupled to the processor and configured to store a label database (LDB) comprising service labels for identifying services in the network, wherein the processor is further configured to reserve the label information from the LDB; the PCECC further comprises a memory coupled to the processor and configured to store an LSP database (LSPDB), wherein the processor is further configured to store path information associated with the LSP in the LSPDB, and wherein the path information comprises the label information.

In yet another embodiment, the disclosure includes a network element (NE) comprising: a receiver configured to: receive, from a path computation element centralized controller (PCECC), a forwarding instruction for forwarding traffic of a service on a label switched path (LSP) in a network, wherein the forwarding instruction indicates a first label identifying the service in the network; and receive a data packet associated with the traffic; a processor coupled to the receiver and configured to attach the first label to the data packet; and a transmitter coupled to the processor and configured to forward the data packet to a next hop node on a path of the LSP according to the forwarding instruction. In some embodiments, the service is a virtual private network (VPN) service, a pseudowire emulation edge-to-edge (PWE3) service, or an Internet Protocol version 6 (IPv6) tunneling service; the NE is independent of any label distribution protocol (LDP) signaling or resource reservation protocol-traffic engineering (RSVP-TE) multiprotocol label switching (MPLS) signaling.

In yet another embodiment, the disclosure includes a system comprising: a path computation element centralized controller (PCECC) configured to: compute a path for a label switched path (LSP) from a first edge node to a second edge node; reserve label information for forwarding traffic of a service on the LSP; transmit a label update message comprising the label information; a network element (NE) located on the path and configured to: receive the label update message from the PCECC; receive a data packet associated with the traffic; attach the label information to the data packet; and transmit the data packet to a next hop node on the path according to the label update message.

Any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
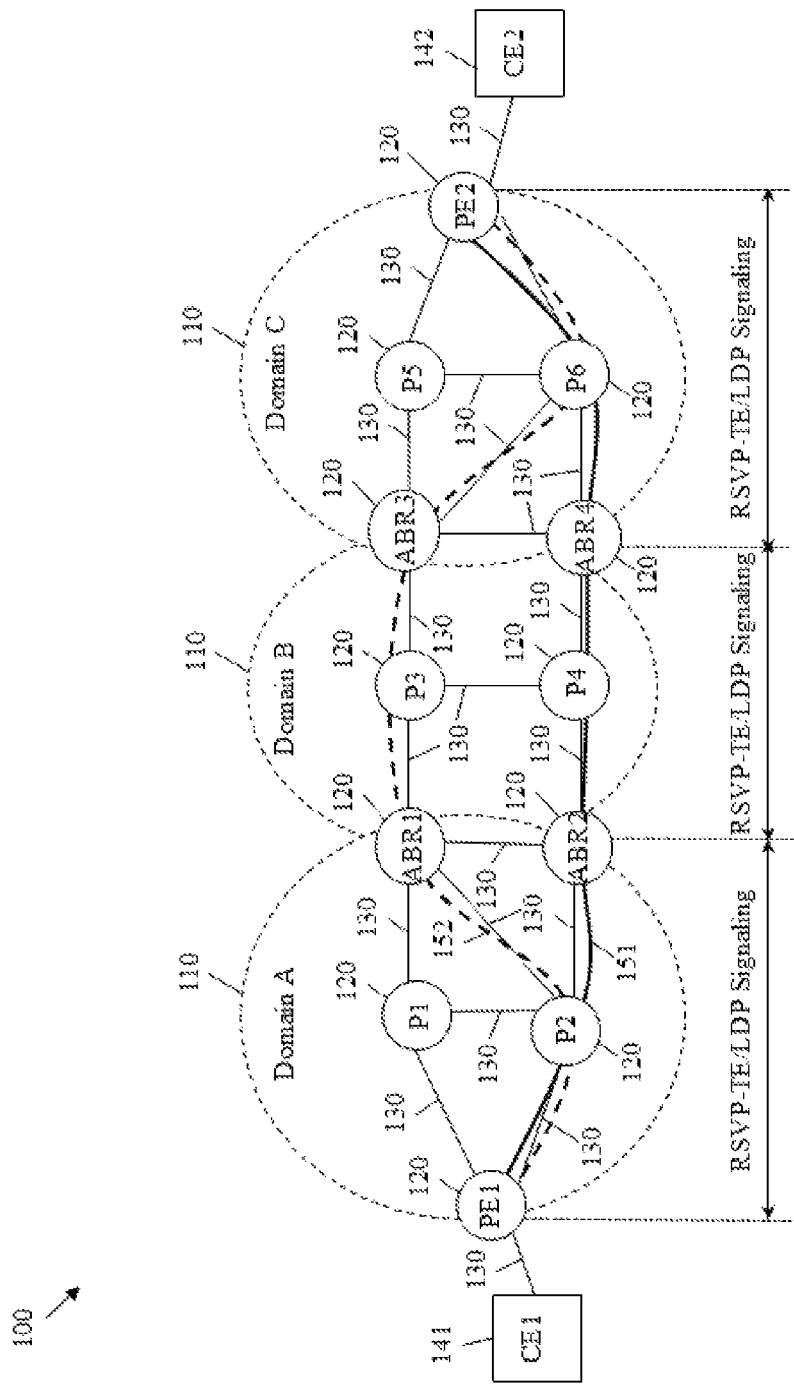
FIG. 1 is a schematic diagram of an MPLS network.

FIG. 1 is a schematic diagram of an MPLS network 100. The network 100 comprises a plurality of nodes 120 interconnected by a plurality of links 130. The nodes 120 are shown as provider edge (PE)1, provider (P)1, P2, area border router (ABR)1, ABR2, P3, P4, ABR3, ABR4, P5, P6, and PE2. The underlying infrastructure of the network 100 may be any type of network such as an electrical network, an optical network, or combinations thereof. The links 130 may comprise physical links such as fiber optic links, electrical links, wireless links, and logical links used to transport data in the network 100. The network 100 employs an Internet protocol (IP) transport layer and an MPLS data forwarding plane. Forwarding paths in the network 100 are referred to as label switched paths (LSPs). During forwarding, data packets are directed along an LSP based on path labels or segment labels attached to the data packets, as described more fully below. The network 100 may be a service provider network. Different portions of the network 100 operate under different domains 110. The domains 110 are shown as domain A, domain B, and domain C. Each domain 110 may be operated by a different administrative authority and may employ a different policy for access and security.

The nodes 120 are any devices or components such as routers and switches configured to perform both MPLS signaling such as LDP or RSVP-TE to establish LSPs in the network 100 and data forwarding along the established LSPs. The nodes PE1 and PE2 120 located at edges of the network 100 are referred to as edge nodes or provider edges. An edge node may connect to one or more nodes outside of the network. As shown, the node PE1 120 is connected to a customer edge (CE) 141, and the node PE2 120 is connected to another CE 142. The CEs 141 and 142 are network devices located at customer sites external to the network 100. The CEs 141 and 142 may originate and/or terminate customer traffic. An edge node that receives traffic from a CE is referred to as an ingress node. An edge node that sends traffic to a CE is referred to as an egress node. The nodes P1, P2, P3, P4, P5, and P6 120 located internally within corresponding domains 110 are referred to as internal nodes. Each of the nodes P1, P2, P3, P4, P5, and P6 120 forwards traffic within a corresponding domain 110. The nodes ABR1, ABR2, ABR3, and ABR4 120 located between borders of multiple domains 110 are referred to as area border routers (ABRs). The nodes ABR1 and ABR2 120 interconnect the domains A and B 110. The nodes ABR3 and ABR4 120 interconnect the domains B and C 110. The nodes ABR1, ABR2, ABR3, and ABR4 120 forward traffic across corresponding domains 120.

The network 100 provides a VPN 151 for carrying traffic from the CE 141 to the CE 142. To create the VPN 151, the node PE1 120 acts as an ingress node to compute a path for an LSP from the node PE1 120 to the node PE2 120 connecting to the CE 141. The VPN 151 is overlaid over the LSP and shown by the thick solid line. The node PE1 120 reserves a VPN label for the VPN 151. The VPN label is a service label that binds or associates traffic to a corresponding VPN. The node PE1 120 initiates the establishment of the LSP for the VPN 151 along the path of the LSP by exchanging IBGP labels and employing RSVP-TE signaling. For example, each node 120 along the LSP of the VPN 151 allocates a local path label from a local label pool for forwarding traffic of the LSP and notifies a next hop node in an upstream direction of the local path label. Upstream refers to the direction from a destination to a source. The nodes 120 along the path of the LSP between the ingress node PE1 120 and the egress node PE2 120 of the LSP are referred to as transit nodes. The path labels direct traffic along the LSP. Each node 120 along the path of the LSP receives a path label from a downstream node along the path and establishes a label mapping list for forwarding data. Downstream refers to the direction from a source to a destination.

In operation, when the node PE1 120 receives a data packet from the CE 141, the node PE1 120 analyzes the data packet, for example, based on the header of the data packet, to determine an FEC or a traffic class for the data packet. When the node PE1 120 determines that the data packet is associated with the VPN 151, the node PE1 120 attaches the reserved VPN label to the data packet to bind the data packet to the VPN 151. In addition, the node PE1 120 attaches the path label of a next hop node along the LSP, which is the node P2 120, to the data packet to direct the data packet along the LSP and forwards the data packet to the node P2 120. For example, the VPN label may be carried in an inner header of the data packet, and the path label may be carried in an outer header of the data packet. Thus, the VPN label is referred to as an inner label and the path label is referred to as an outer label of the data packet.

When the node P2 120 receives the data packet, the node P2 120 replaces the outer path label with the path label of a next hop node along the LSP, which is the node ABR2 120, and forwards the data packet to the node ABR2 120. The path label in a header of an incoming packet is referred to as an incoming label. The path label in a header of an outgoing packet is referred to as an outgoing label. This forwarding process is repeated at each node 120 along the path of the LSP.

When the egress node of the LSP, which is the node PE2 120, receives the data packet, the node PE2 120 pops or removes the outer path label and the inner VPN label and forwards the data packet to the CE 142. The network 100 may provide any number of VPNs using similar mechanisms. For example, the network 100 is further configured to provide a VPN 152 similar to the VPN 151 as shown by the thick dashed line. The VPNs 151 and 152 are referred to as MPLS VPNs or open system interconnection (OSI) layer 3 (L3) VPNs (L3VPNs).

Figure 2:
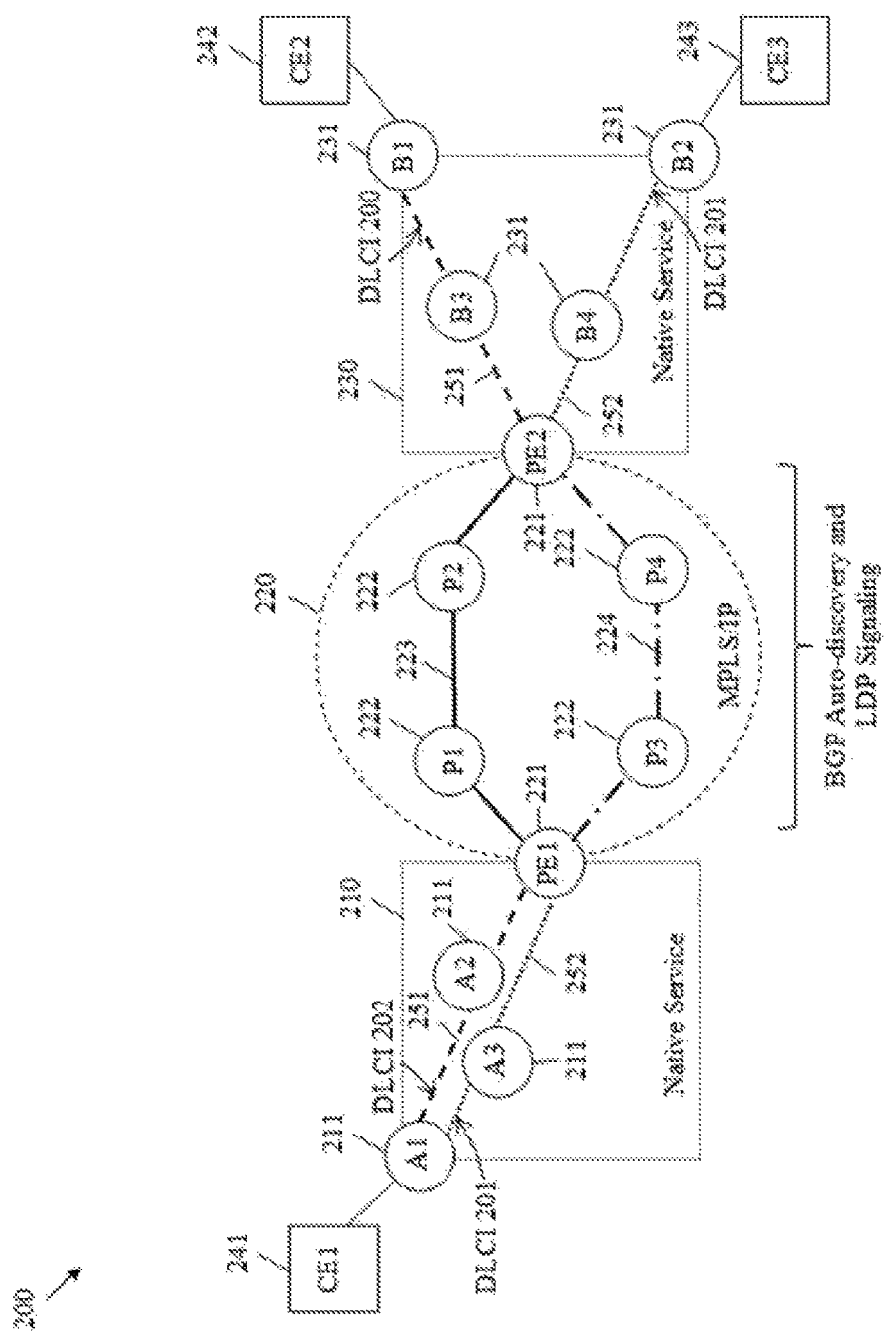
FIG. 2 is a schematic diagram of an MPLS-based pseudowire emulation edge-to-edge (PWE3) network.

FIG. 2 is a schematic diagram of an MPLS-based PWE3 network 200. The network 200 comprises a first network 210, an MPLS network 220, and a second network 230. The first network 210 and the second network 230 are OSI layer 2 (L2) networks or data link layer networks such as connection-oriented frame relay networks that provide native services. The first network 210 comprises a plurality of nodes 211 interconnected by links (not shown), which are similar to the links 130. The second network 230 comprises a plurality of nodes 231 interconnected by links (not shown) similar to the links 130. The nodes 211 and 231 are any devices or components such as frame relay switches configured to provide dedicated virtual circuits (VCs) 251 and 252 in a point-to-point (P2P) configuration for data transportation. The VC 251 is shown by the thick dashed line. The VC 252 is shown by the thick dotted line. The nodes 211 set up portions of the VCs 251 and 252 locally in the first network 210 and the nodes 231 set up portions of the VCs 251 and 252 in the second network 230. VCs are identified by data link layer connection identifiers (DLCIs) 201, 202. For example, data packets are divided into frames, and a DLCI is attached to each frame to bind or associate the frame to an assigned VC for forwarding.

The MPLS network 220 is similar to the network 100. The MPLS network 220 comprises a plurality of edge nodes 221 and internal nodes 222 similar to the nodes 120 interconnected by links (not shown) similar to the links 130. The edge node PE1 221 is connected to the first network 210. The edge node PE2 221 is connected to the second network 230. The MPLS network 220 may further comprise additional edge nodes and internal nodes and may operate under one or more domains similar to the domains 110. The MPLS network 220 is configured to function as pseudowires 223 and 224 to connect the VCs 251 and 252 from the first network 210 to the second network 230, respectively. The pseudowire 223 is shown by the thick solid line. The pseudowire 224 is shown by the thick dash-dotted line. The pseudowires 223 and 224 are tunnels or LSPs. The edge nodes 221 perform border gateway protocol (BGP) auto-discovery to discover other edge nodes in the same MPLS domain.

The VCs 251 and 252 may function as VPNs for carrying traffic from the CE 241 to the remote CEs 242 and 243, respectively. The CEs 241, 242, and 243 are similar to the CEs 141 and 142. To create a pseudowire 223 for the VC 251, the node PE1 221 acts as an ingress node to compute a path for an LSP from the node PE1 221 to the node PE2 222 and reserves a DLCI label for the VC 251. The edge nodes 221 and the internal nodes 222 along the path of the LSP establish the LSP using LDP signaling similar to the mechanisms described in the network 100.

In operation, when the node 211 receives a data packet from the CE 241, the node 211 forwards the data packet to the MPLS network 220 via the VC 251 in the first network 210. When the node PE1 221 receives a data packet from the first network 210, the node PE1 221 analyzes the data packet, for example, a DLCI field in the header of the data packet, to determine a forwarding class or traffic class for the data packet. When the node PE1 221 determines that the data packet is associated with the VC 251, the node PE1 221 attaches the reserved DLCI label to the data packet. In addition, the node PE1 221 attaches a path label of a next hop node along the LSP and forwards the data packet to the next hop node. The DLCI label may be an inner label, and the path label may be an outer label of the data packet. The nodes on the path of the LSP subsequently forward the data packet along the LSP using similar mechanisms as described in the network 100. When the node PE2 221 receives the data packet, the node PE2 221 removes the path label and the DLCI label and forwards the data packet to the second network 230. The nodes on the VC 251 of the second network 230 subsequently forward the data packet along the VC 251. When the node B1 231 receives the data packet, the node B1 231 forwards the data packet to the CE 242. The establishment and data forwarding in the VC 252 is similar to the VC 251. The VPNs provided by the VCs 251 and 252 are referred to as OSI layer 2 (L2) VPNs (L2VPNs).

Although VPN and PWE3 services may be implemented through MPLS, the deployment and maintenance of MPLS are complex as described above. A centralized networking model as described in the U.S. patent application Ser. No. 14/511,591 filed Oct. 10, 2014 by Zhao, et al., and titled "Using PCE as SDN Controller," ("'591 application") and Zhao, et al., "PCEP Procedures and Protocol Extensions for Using PCE as a Central Controller (PCECC) of LSPs," Internet Engineering Task Force (IETF) draft, Mar. 16, 2016 ("Zhao"), which are incorporated by reference, may be beneficial for providing VPN and PWE3 services over MPLS. However, the '591 application and Zhao may not have support for VPN and PWE3 services over MPLS.

Disclosed herein are various embodiments for providing MPLS LSP tunnel-based network services such as L3VPNs, L2VPNs, PWE3s, and IPv6 tunnels by using a PCECC to negotiate and distribute service label assignments in MPLS networks. The disclosed embodiments extend the centralized networking model described in the '591 application and Zhao to support the tunnel-based services as described in Zhao, "The Use Cases for Using PCE as the Central Controller (PCECC) of LSPs," IETF draft, Mar. 17, 2016, which is incorporated by reference. The PCECC performs path computations and service label negotiations and allocations, eliminating the complex management and distribution of labels at network nodes. The PCECC constructs and maintains LSP forwarding objects comprising forwarding instructions for network nodes along computed LSPs. The PCECC downloads the LSP forwarding objects to the network nodes. The network nodes function as forwarding devices without implementing control plane functions such as BGP, IBGP, IGP, and LDP and RSVP-TE MPLS signaling. The disclosed embodiments introduce signaling mechanisms among the PCECC and path computation clients (PCCs) for resource reservation, service label allocation, and forwarding entry distribution. Service labels may be VPN labels, PWE3 or DLCI labels, or IPv6 labels. The disclosed embodiments are suitable for use in various types of networks such as data centers, content delivery networks, core networks, SDN transitioning networks, and transport networks. The disclosed embodiments may be applied to various technologies such as source routing-based forwarding, multi-topology network virtualization (NV), path computation, LSP monitoring, optical network path computation element (PCE), network resiliency, and application-aware smart traffic TE. The disclosed embodiments allow for provisioning of VPN and PWE services over various domains and tunnels, including both IPv4 and IPv6 domains and tunnels.

Figure 3:
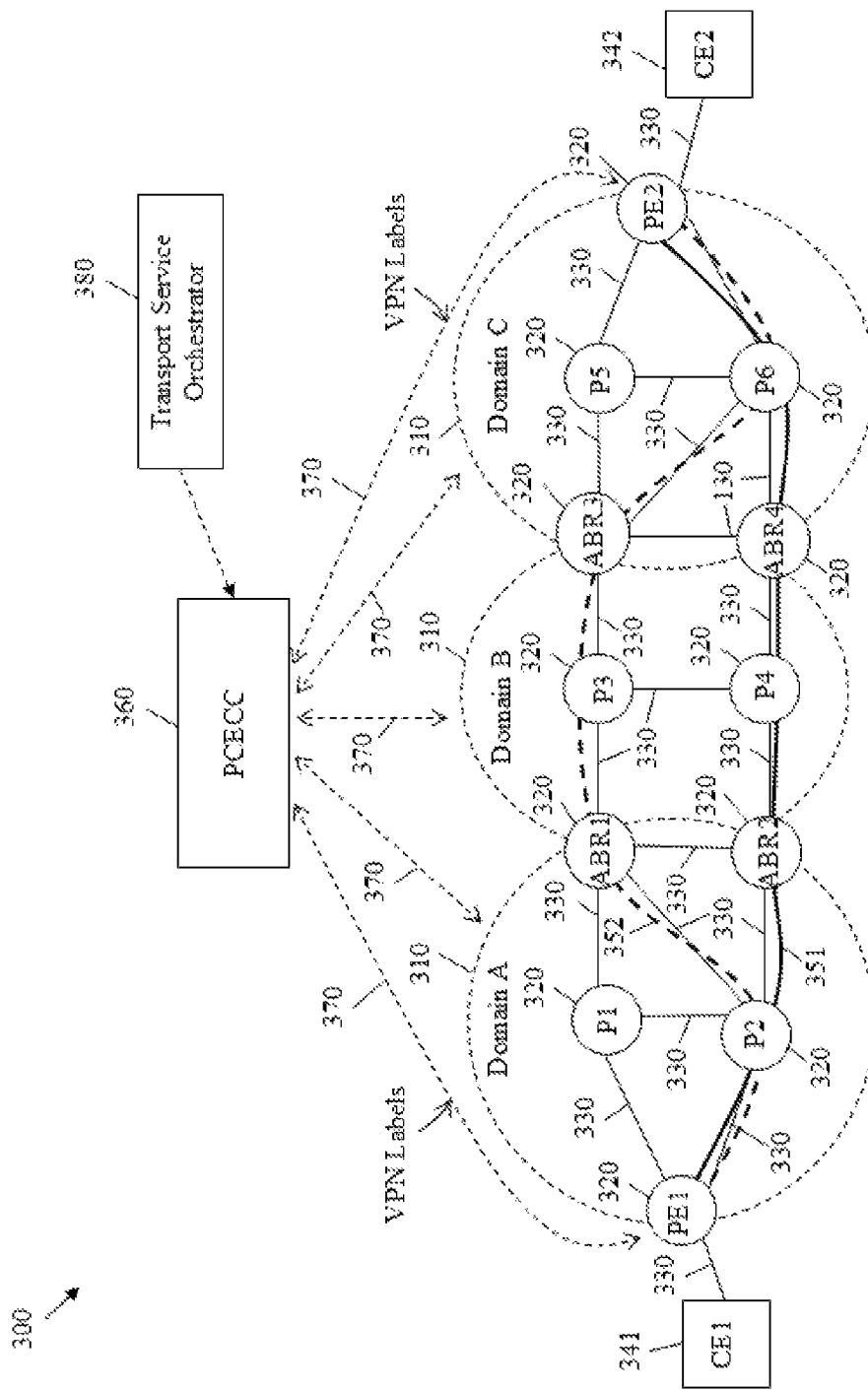
FIG. 3 is a schematic diagram of an MPLS network that employs a PCECC to provide virtual private network (VPN) services according to an embodiment of the disclosure.

FIG. 3 is a schematic diagram of an MPLS network 300 that employs a PCECC to provide VPN services according to an embodiment of the disclosure. The network 300 decouples MPLS signaling from data forwarding similar to the decoupling of the control plane and the forwarding plane in SDN networks. The network 300 comprises at least one PCECC 360 and a plurality of nodes 320 interconnected by a plurality of links 330. The network 300 operates under multiple domains 310 similar to the domains 110. For example, the domains 310 are IP version 4 (IPv4) domains. The links 330 are similar to the links 130. The PCECC 360 is in direct data communication with each node 320 via a plurality of communication channels 370. The communication channels 370 may be implemented via a path computation element communication protocol (PCEP), an interior gateway protocol (IGP), or any suitable communications protocol. In addition, the PCECC 360 is in data communication with a transport service orchestrator 380.

The PCECC 360 may be a virtual machine (VM), a hypervisor, or any other device configured to manage and configure the nodes 320 to provide VPN services. The PCECC 360 directly receives from each node 320 information such as path information, network status information, label information, topology information, and constraint information. The PCECC 360 maintains and tracks the topology information, the label information, and the path information of all nodes 320. The PCECC 360 computes forwarding paths for each node 320 according to the topology information and the constraint information. The PCECC 360 may receive traffic information from a traffic controller analyzer and may compute the forwarding paths according to the traffic information. Traffic information may include statistics of traffic along the links 330 such as a number of packets sent, a number of packets dropped, and latency. The PCECC 360 reserves path labels for each node 320 to forward traffic along the computed paths. The PCECC 360 reserves VPN labels for creating VPNs in the network 300 and distributes the VPN labels to corresponding edge nodes 320. The PCECC 360 builds forwarding objects for the nodes 320. A forwarding object may include traffic classification information, incoming traffic interface or port information, outgoing traffic interface or port information, path labels, and VPN labels. The PCECC 360 sends the forwarding objects to corresponding nodes 320 in the network 300.

The nodes 320 are any software programmable devices configured to perform forwarding functions in the network 300 according to forwarding instructions or forwarding objects received from the PCECC 360. The nodes 320 may be referred to as SDN compatible or SDN-enabled nodes since the nodes 320 function as forwarding devices in the network 300 without implementing a control plane. Unlike the networks 100 and 200, the nodes 320 located at the edges of the network 300 do not compute paths or reserve VPN labels for creating VPNs. In addition, all nodes 320 in the network 300 have no need to implement the LDP, the RSVP-TE protocol, or similar set-up signaling along computed paths. Thus, the network complexity and control signaling in the network 300 is greatly reduced when compared to the networks 100 and 200.

The network 300 may provide VPNs 351 and 352. The VPNs 351 and 352 are shown by the thick solid line and the thick dashed line, respectively. For example, the PCECC 360 receives a VPN creation request from the transport service orchestrator 380 to create a VPN 351. The transport service orchestrator 380 may be a VM, a server, or any device configured to communicate with customers, users, and client applications. The VPN creation request may indicate the CEs 341 and 342 and constraints such as link bandwidths. The PCECC 360 computes a path for an LSP from the CE 341 to the CE 342. The LSP is used to serve the VPN 351 requested by the transport service orchestrator 380. The PCECC 360 allocates path labels on the nodes 320 along the path of the LSP. The PCECC 360 allocates a VPN label for the VPN 351. The PCECC 360 builds forwarding objects according to the computed path, the reserved path labels, and the reserved VPN label for each node 320 along the path of the LSP. For example, forwarding objects for an ingress node of such as the node PE1 320 and an egress node such as the node PE2 320 include the reserved VPN label while forwarding objects for transit nodes may exclude the reserved VPN label. The PCECC 360 downloads the forwarding objects to the nodes 320 along the path of the LSP. Subsequently, the nodes 320 along the path of the LSP for the VPN forward traffic of the VPN according to the forwarding objects received from the PCECC 360. The forwarding objects may instruct the nodes 320 to perform similar forwarding operations as described in the network 100. The PCECC 360 may create any number of VPNs across any number of domains by using similar mechanisms. In addition, the network 300 may be supported by extending the PCEP, as described fully below.

Figure 4:
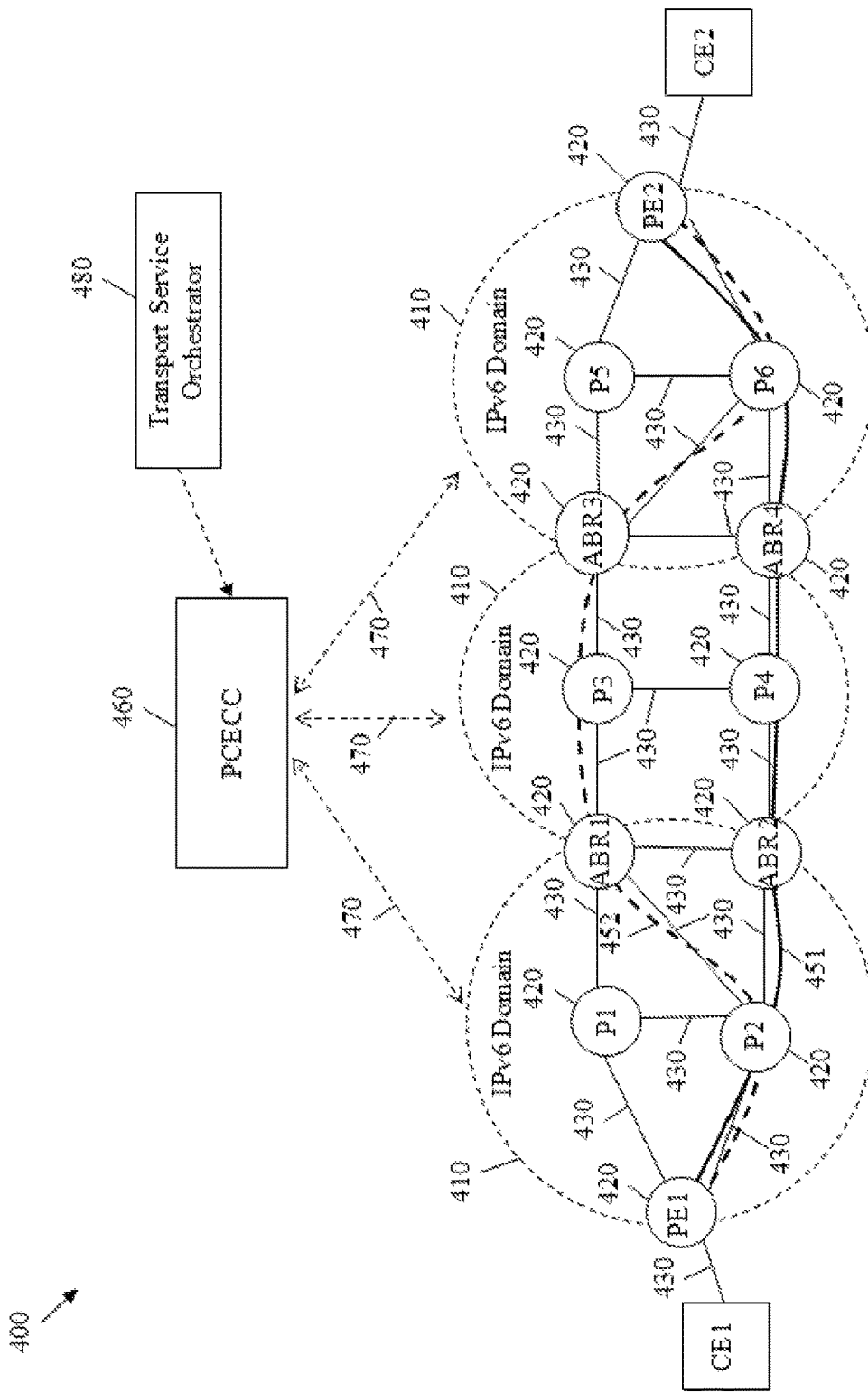
FIG. 4 is a schematic diagram of an MPLS network that employs a PCECC to provide Internet Protocol version 6 (IPv6) tunneling services according to an embodiment of the disclosure.

FIG. 4 is a schematic diagram of an MPLS network 400 that employs a PCECC to provide IPv6 tunneling services according to an embodiment of the disclosure. The network 400 is similar to the network 300, but comprises an IPv6 transport layer instead of an IPv4 transport layer. The network 400 comprises a PCECC 460 and a plurality of nodes 420 interconnected by a plurality of links 430. The network 400 operates under a plurality of IPv6 domains 410. The nodes 420 are similar to the nodes 120, 221, 222, and 320, but support IPv6. The links 430 are similar to the links 130 and 330. The PCECC 460 is in direct data communication with each node 420 via a plurality of communication channels 470. The PCECC 460 is similar to the PCECC 360.

The PCECC 460 may receive IPv6 tunnel service requests from a transport service orchestrator 480 similar to the transport service orchestrator 380. In response to the requests, the PCECC 460 creates IPv6 tunnels 451 and 452 in the network 400 by employing similar LSP creation mechanisms as the PCECC 360. The IPv6 tunnels 451 and 452 are shown by the thick solid line and the thick dashed line, respectively. The IPv6 tunnels 451 and 452 are configured to carry IPv6 traffic. The PCECC 460 generates forwarding objects including path labels with IPv6 address information. The PCECC 460 downloads forwarding objects to the nodes 420 via communication channels 470 similar to the communication channels 370. The PCECC 460 may create any number of IPv6 tunnels across any number of domains by using similar mechanisms. In addition, VPNs such as the VPNs 151, 152, 351, and 352 may be overlaid on top of IPv6 tunnels similar to the IPv6 tunnels 451 and 452. Further, the network 400 may be supported by extending the PCEP, as described fully below.

Figure 5:
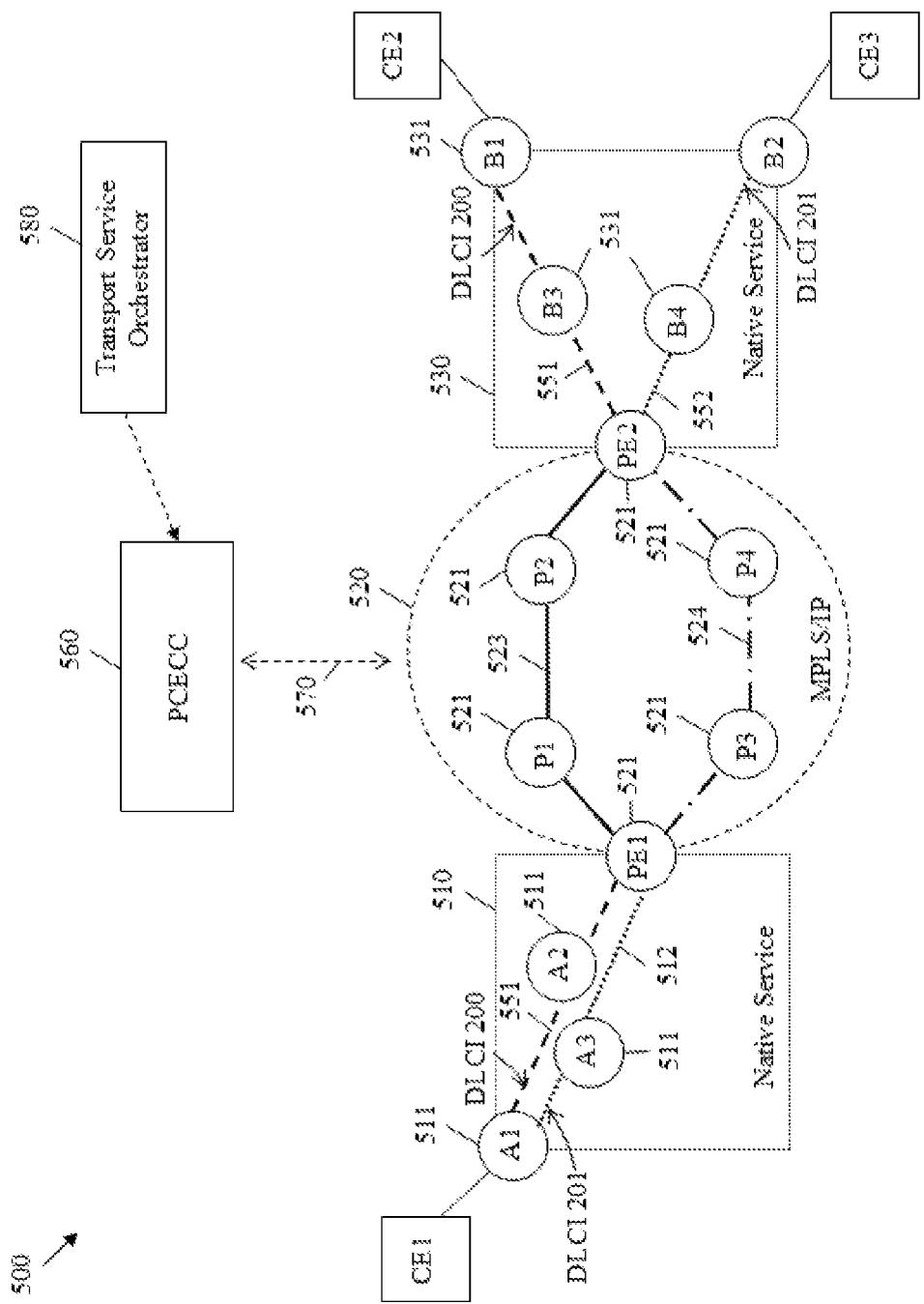
FIG. 5 is a schematic diagram of an MPLS-based PWE3 network that employs a PCECC to provide PWE3 services according to an embodiment of the disclosure.

FIG. 5 is a schematic diagram of an MPLS-based PWE3 network 500 that employs a PCECC to provide PWE3 services according to an embodiment of the disclosure. The network 500 is similar to the network 200, but employs similar mechanisms as in the networks 300 and 400 to decouple MPLS signaling from data forwarding. The network 500 comprises a PCECC 560, a first network 510, an MPLS network 520, and a second network 530. The PCECC 560 is similar to the PCECCs 360 and 460. The first network 510 and the second network 530 are similar to the first network 210 and the second network 230, respectively.

Similar to the MPLS network 220, the MPLS network 520 provides pseudowires 523 and 524 to connect portions of VCs 551 and 552 in the network 510 to corresponding portions of the VCs 551 and 552 in the second network 530, respectively. The pseudowires 523 and 524 are similar to the pseudowires 223 and 224. However, the PCECC 560 creates the pseudowires 523 and 524. The PCECC 560 receives PWE3 service requests from a transport service orchestrator 580 similar to the transport service orchestrators 380 and 480. The PCECC 560 performs similar LSP creation mechanisms as the PCECCs 360 and 460. Thus, the network 520 does not employ BGP auto-discovery and LDP signaling.

For example, the PCECC 560 computes paths, reserves path labels, and downloads forwarding objects to each node 521 similar to the nodes 320 and 420 in the network 520 via communication channels 570 similar to the communication channels 370 and 470. In addition, the PCECC 560 negotiates and reserves DLCI labels or PWE3 labels with edge nodes 521 to identify the pseudowires 523 and 524 in the network 520 and distributes the DLCI labels to corresponding edge nodes 521 in the MPLS network 520. Subsequently, the nodes 521 on the paths of the pseudowires 523 and 524 forward traffic of the VCs 551 and 552 according to the forwarding objects or instructions received from the PCECC 560. The PCECC 560 may create any number of PWE3 services across any number of domains by using similar mechanisms. In addition, PWE3 services may be overlaid on top of IPv6 tunnels similar to the IPv6 tunnels 451 and 452. Further, the network 500 may be supported by extending the PCEP, as described fully below.

Figure 6:
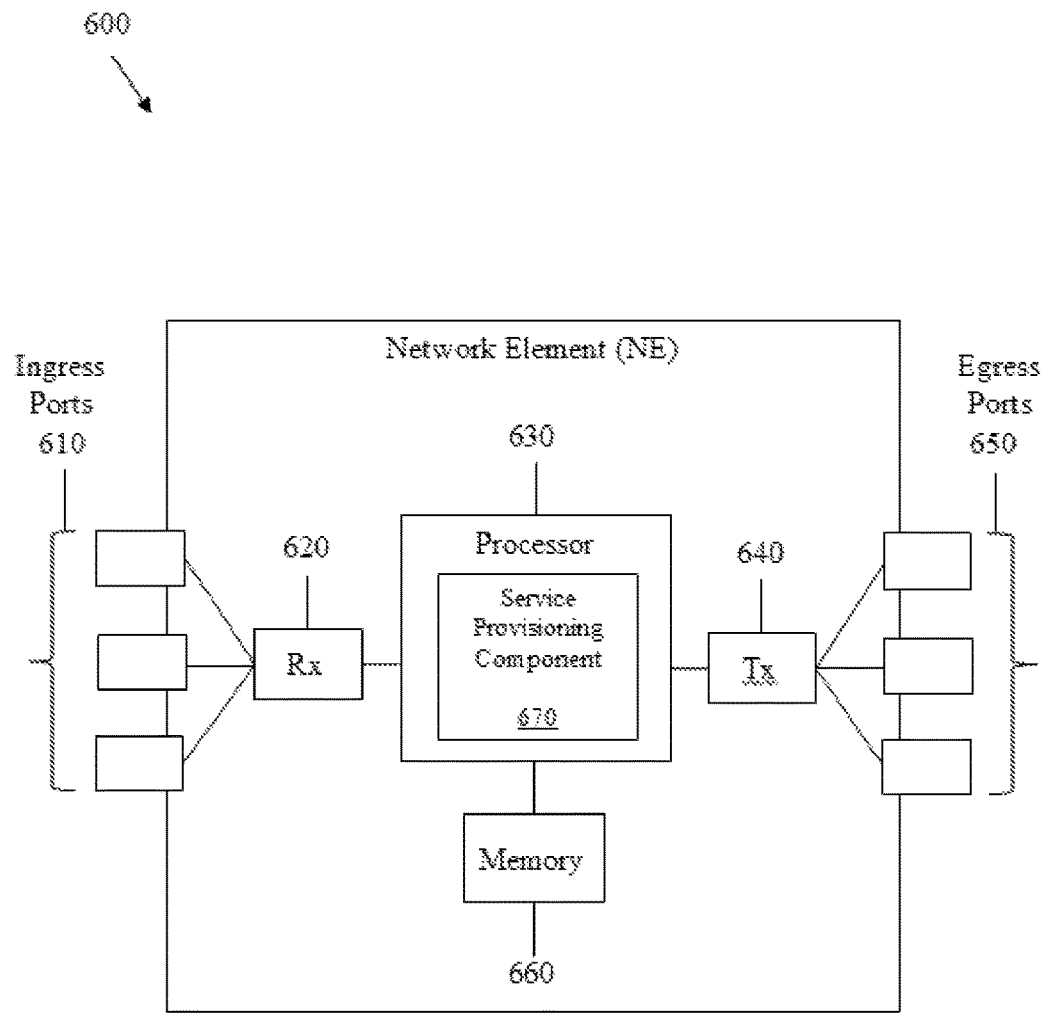
FIG. 6 is a schematic diagram of a network element (NE) according to an embodiment of the disclosure.

FIG. 6 is a schematic diagram of an NE 600 according to an embodiment of the disclosure. The NE 600 is suitable for implementing the disclosed embodiments. The NE 600 comprises ingress ports 610 and receiver units (Rx) 620 for receiving the data; a processor, logic unit, or central processing unit (CPU) 630 to process the data; transmitter units (Tx) 640 and egress ports 650 for transmitting the data; and a memory 660 for storing the data. The device 600 may also comprise optical-to-electrical (OE) components and electrical-to-optical (EO) components coupled to the ingress ports 610, the receiver units 620, the transmitter units 640, and the egress ports 650 for ingress or egress of optical or electrical signals.

The processor 630 is implemented by any suitable combination of hardware, middleware, firmware, and software. The processor 630 may be implemented as one or more CPU chips, cores (e.g., as a multi-core processor), field-programmable gate arrays (FPGAs), application specific integrated circuits (ASICs), or digital signal processors (DSPs). The processor 630 is in communication with the ingress ports 610, receiver units 620, transmitter units 640, egress ports 650, and memory 660. The processor 630 comprises a service provisioning component 670. The service provisioning component 670 implements the disclosed embodiments, for instance the methods 800, 900, 1000, and 1100, as described more fully below. The inclusion of the service provisioning component 670 therefore provides a substantial improvement to the functionality of the NE 600 and effects a transformation of the NE 600 to a different state. Alternatively, the service provisioning component 670 is implemented as instructions stored in the memory 660 and executed by the processor 630. The processor 630, the memory 660, or both may store the methods 800, 900, 1000, and 1100 so that the NE 600 may implement the methods 800, 900, 1000, and 1100. Further, in the alternative embodiment, the NE 600 may comprise any other means for implementing the methods 800, 900, 1000, and 1100.

The memory 660 comprises one or more disks, tape drives, or solid-state drives and may be used as an over-flow data storage device, to store programs when such programs are selected for execution, or to store instructions and data that are read during program execution. The memory 660 may be volatile and/or non-volatile and may be read-only memory (ROM), random-access memory (RAM), ternary content-addressable memory (TCAM), or static random-access memory (SRAM).

Figure 7:
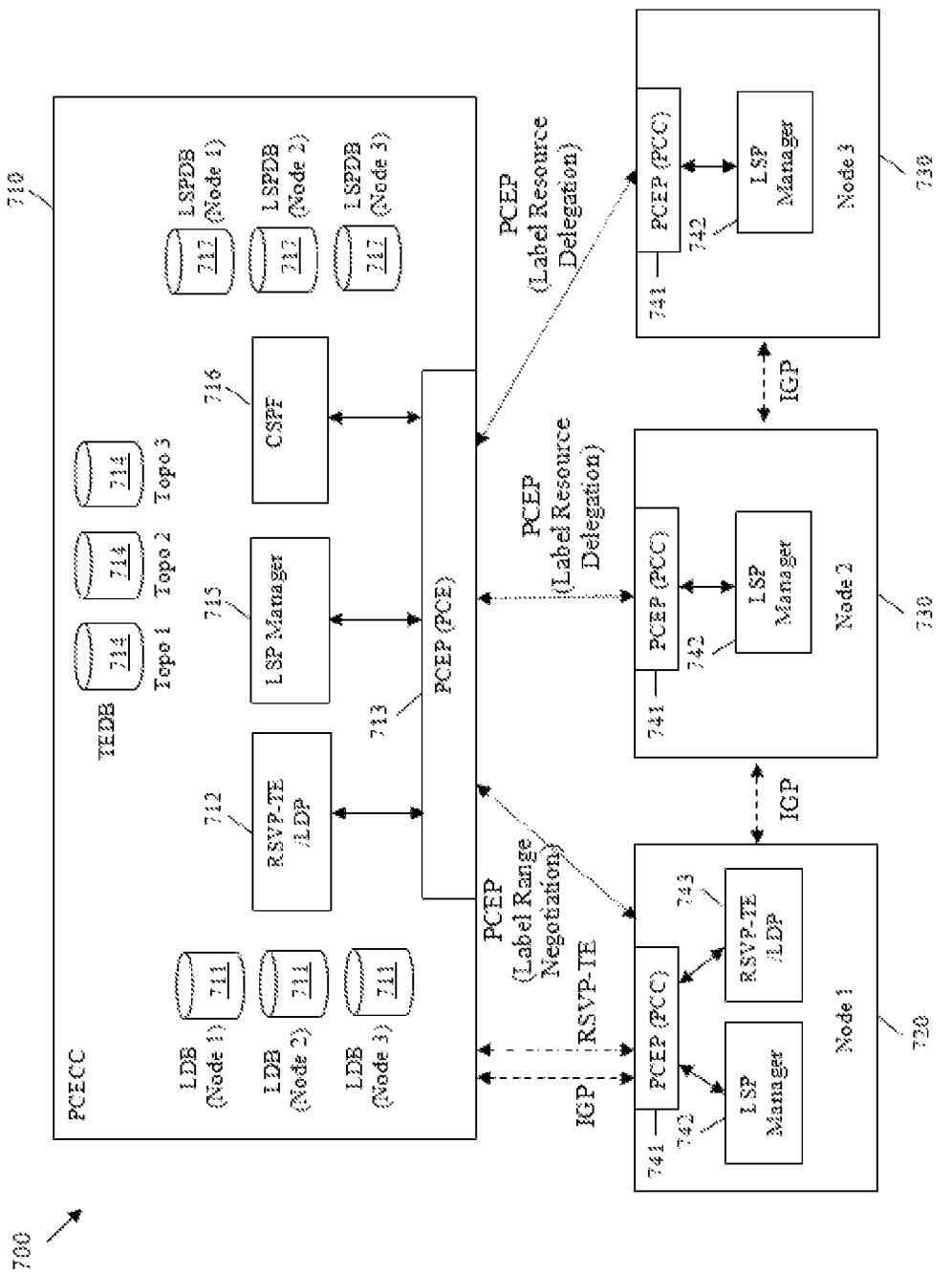
FIG. 7 is a schematic diagram of a network comprising legacy nodes and SDN-enabled nodes according to an embodiment of the disclosure.

FIG. 7 is a schematic diagram of a network 700 comprising legacy nodes and SDN-enabled nodes according to an embodiment of the disclosure. The network 700 is similar to the networks 300, 400, and 520, but comprises a PCECC 710 in data communication with a combination of the legacy node 720 and SDN-enabled nodes 730. The PCECC 710 is similar to the PCECCs 360, 460, and 560, but provides a more detailed view of its internal components. The legacy node 720 is similar to the nodes 120, 221, and 222 and performs both control plane and data plane functions. The legacy node 720 is also referred to as a non-SDN compatible node or a non-SDN-enabled node. The SDN-enabled nodes 730 are similar to the nodes 320, 420, and 521 and functions as forwarding devices. The PCECC 710 communicates with both the legacy node 720 and the SDN-enabled nodes 730 via PCEP for label range negotiation, label resource delegation, and RSVP-TE/LDP protocol processing. The PCECC 710 may configure the legacy node 720 and the SDN-enabled nodes 730 to create VPN services such as the VPNs 351 and 352, IPv6 tunneling services such as the IPv6 tunnels 451 and 452, and PWE3 services such as the pseudowires 523 and 524. The legacy node 720 and the SDN-enabled nodes 730 communicate with each other via IGP.

The PCECC 710 comprises an RSVP-TE/LDP component 712, a PCEP component 713, a constraint shortest path first (CSPF) component 716, an LSP manager 715, a plurality of label databases (LDBs) 711, a plurality of traffic engineering databases (TEDBs) 714, and a plurality of LSP databases (LSPDBs) 717. The TEDBs 714 comprise topology information, link information, node information, and other information related to the network 700's performance and optimization. Topology information includes the arrangement of nodes such as the legacy node 720 and the SDN-enabled nodes 730 and links such as the links 130, 330, and 430. Multiple topologies may be overlaid over the nodes and links in a network. Link information may include unreserved link bandwidths, maximum link bandwidths, and link states. Node information may include node addresses and statuses. A memory device such as the memory 660 at the PCECC 710 or external to the PCECC 710 may store the TEDBs 714. For example, the TEDBs 714 may store information of different topologies in separate TEDBs 714 as shown or in any other suitable configuration.

The CSPF component 716 is configured to compute routing paths through a network such as the networks 300, 500, and 500 to meet certain constraints. The CSPF component 716 may employ a CSPF algorithm. For example, the CSPF component 716 consults with the TEDB 714 when performing path computations.

The LDBs 711 comprise label resource information, which may include a list of path labels and service labels on the legacy node 720 and the SDN-enabled nodes 730. The path labels and the service labels may have separate label spaces so that they do not overlap. For example, each LDB 711 may store labels on a particular node. The RSVP-TE/LDP component 712 is configured to assign and delegate path labels to the SDN-enabled nodes 730, negotiate label ranges with the legacy node 720, and set up LSPs in the network 700, as described more fully below. The LDBs 711 may comprise separate label spaces for LSPs, a VPN service, a PWE3 service, and an IPv6 service. The RSVP-TE/LDP component 712 may store and track labels assigned to the SDN-enabled nodes 730 in the LDBs 711. The RSVP-TE/LDP component 712 may also store and track labels used by the legacy node 720.

The PCEP component 713 is configured to communicate with the legacy node 720 and SDN-enabled nodes 730. The PCEP component 713 may implement the PCEP PCE functions with extensions. The PCEP component 713 sends forwarding instructions to the SDN-enabled nodes 730 to facilitate data forwarding along LSPs in the network 700. In addition, the PCEP component 713 exchanges PCEP messages with the legacy node 720 to initiate set-up of LSPs in the network 700.

The LSPDBs 717 comprises path information, forwarding information, states, and any other information related to LSPs in the network 700. The path information may include a sequence of nodes traversed by an LSP. For example, the LSP for the VPN 351 may be stored in the form of {PE2←P6←ABR4←P4←ABR2←P2←PE1} to represent the sequence of nodes that the LSP traverses. The forwarding information may include a forwarding object comprising forwarding instructions for each node along the path of an LSP. A forwarding object for an ingress node of an LSP may include an instruction to attach a service label such as a VPN label or a DLCI label and an outgoing path label. A forwarding object for a transit node along an LSP may include an instruction to swap an incoming path label with an outgoing path label. A forwarding object for an egress node of an LSP may include an instruction to remove an incoming path label and a service label. The LSPDBs 717 may comprise separate sub-databases for IPv4 LSPs and IPv6 LSPs. The LSP manager 715 is configured to coordinate with the CSPF component 716, the RSVP-TE/LDP component 712, and the PCEP component 713 to create, delete, modify, and maintain LSPs to provision for services such as the VPNs 351 and 352, the IPv6 tunnels 451 and 452, and the PWE3s or pseudowires 223 and 224.

Each of the legacy node 720 and the SDN-enabled nodes 730 comprises a PCEP component 741 and an LSP manager 742. The legacy node 720 further comprises an RSVP-TE/LDP component 743. The PCEP component 741 is configured to implement PCEP PCC functions and communicate with the PCEP component 713 of the PCECC 710. At each SDN-enabled node 730, the PCEP component 741 receives forwarding objects or instructions and label resource delegation from the PCEP component 713 and the LSP manager 742 facilitates data forwarding over LSPs according to forwarding objects received from the PCECC 710. For example, each SDN-enabled node 730 comprises a forwarding information base (FIB) and a forwarding engine. The LSP manager 742 may store the received forwarding objects in the FIB and configure the forwarding engine according to the FIB during data forwarding.

At the legacy node 720, the RSVP-TE/LDP component 743 negotiates path label ranges with the PCECC 710 via the PCEP component 741. For example, the legacy node 720 negotiates with the PCECC 710 for a particular range of path label values and manages the path labels locally. For example, the RSVP-TE/LDP component 743 selects a path label value for a particular LSP from the negotiated path labels and notifies the PCECC 710 of the assigned path label. The PCECC 710 may store path labels of the legacy node 720 in a corresponding LDB 711. The PCECC 710 may also store LSP information associated with the legacy node 720 in a corresponding LSPDB 717. The LSP manager 742 sets up, deletes, modifies, and maintains LSPs as instructed by the PCECC 710.

In operation, the PCECC 710 receives a request to create a VPN in the network 700, for example, from a transport service orchestrator such as the transport service orchestrator 380. The LSP manager 715 requests the CSPF component 716 to compute a path for an LSP to serve the VPN. The LSP manager 715 requests the RSVP-TE/LDP component 712 to reserve path labels for nodes along the path of the LSP. The LSP manager 715 reserves a VPN label from the LDBs 711 for the VPN. The VPN label is specific to each LDB 711, so each LDB 711 knows the corresponding relationship between the VPN label and the VPN service. The LSP manager 715 builds forwarding objects according to the computed path, the reserved VPN label, and the reserved path labels. The LSP manager 715 stores the forwarding objects and any other information associated with the LSP in the LSPDBs 717. The LSP manager 715 may store forwarding objects of each node in a separate LSPDB 717 as shown or in another suitable configuration. The LSP manager 715 coordinates with the PCEP component 713 to download the forwarding objects to the SDN-enabled nodes 730 along the path of the LSP. When the legacy node 720 is along the path of the LSP, the LSP manager 715 coordinates with the RSVP-TE/LDP component 712 and the PCEP component 713 to negotiate path labels with the legacy node 720. By allowing the PCECC 710 to establish LSPs with both legacy nodes and SDN-enabled nodes using different protocols, the PCECC 760 is suitable for use during SDN migration from existing networks.

Figure 8:
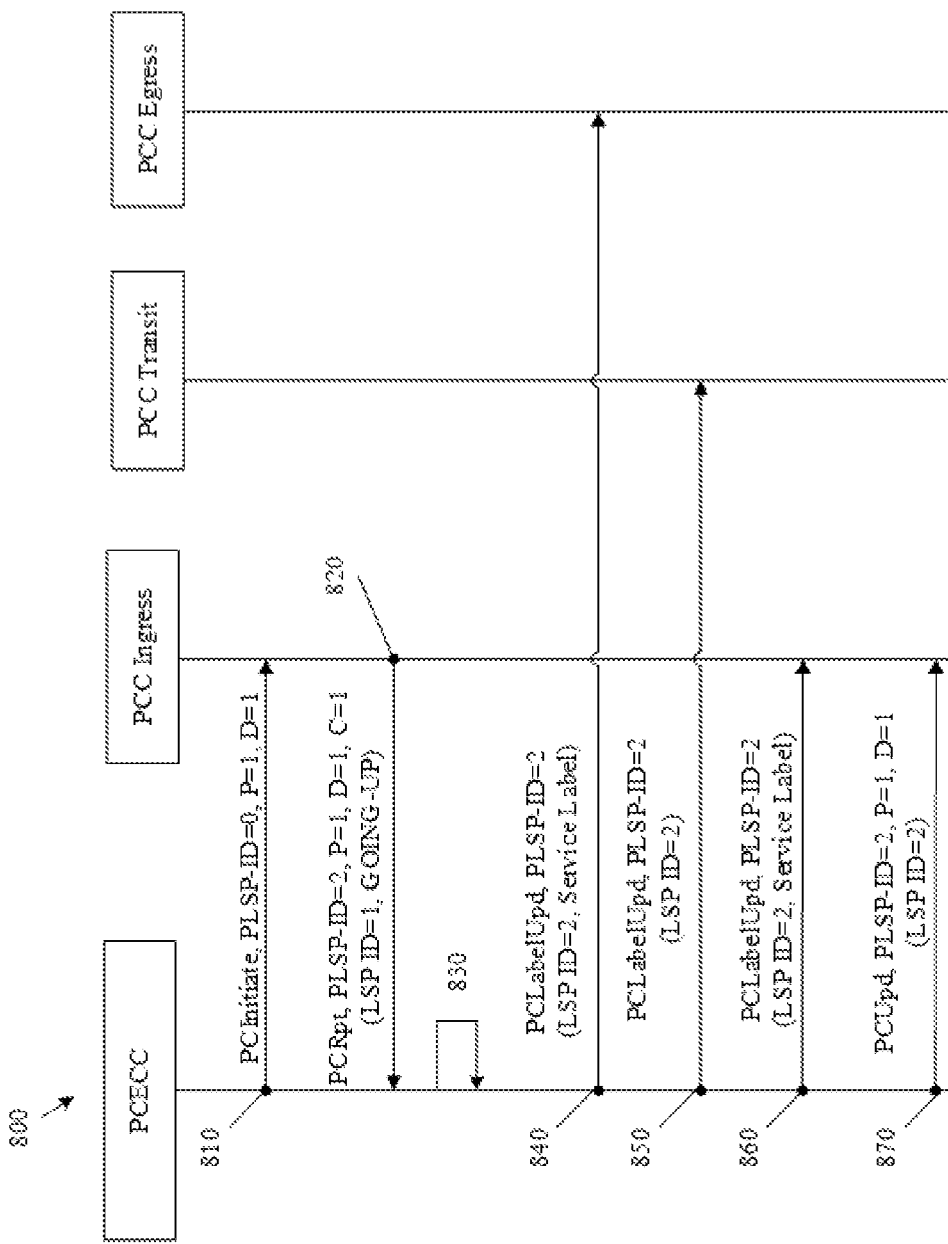
FIG. 8 is a protocol diagram of a method of provisioning a service according to an embodiment of the disclosure.

FIG. 8 is a protocol diagram of a method 800 of provisioning a service according to an embodiment of the disclosure. A PCECC similar to the PCECC 360, 460, 560, and 710, a PCC ingress, a PCC transit, and a PCC egress similar to the nodes 320, 420, 521, and 730, and the NE 600 may implement the method 800. The method 800 is implemented after the PCECC computes a path for an LSP to serve the service, for example, using a CSPF component such as the CSPF component 716. The path traverses from the ingress node to the egress node via the transit node.

At step 810, the PCECC sends a path computation LSP initiate request (PCInitiate) message to the PCC ingress node to initiate instantiation of the LSP. The PCInitiate message is described in Crabbe, et al., "PCEP Extensions for PCE-initiated LSP Setup in a Stateful PCE Model," IETF draft, Oct. 19, 2015 ("Crabbe"), which is incorporated by reference. The PCInitiate message comprises a PCE-specific identifier for the LSP (PLSP-ID), a P flag, and a D flag. The PLSP-ID is set to a value of 0 when initiating the instantiation. The P flag is set to a value of 1 to indicate that PCECC creates the associated LSP. The D flag is set to a value of 1 to indicate that the PCECC delegates the control of the LSP to the PCC ingress node.

At step 820, the PCC ingress sends a path computation state report (PCRpt) message to the PCECC. The PCRpt message is described in Crabbe. The PCRpt message comprises a PLSP-ID, a P flag, a D flag, and a C flag. The PLSP-ID is set to a value of 2 for identifying the LSP. The P flag and the D flag are set to the same values as in the received PCInitiate message. The C flag is set to a value of 1 to indicate that the PCInitiate message initiates the creation of the LSP.

At step 830, upon receiving the PCRpt message, the PCECC sets an LSP identifier (LSP-ID) to 2 for the LSP according to the PLSP-ID received in the PCRpt message. At step 840, the PCECC sends a first path computation update (PCLabelUpd) message to the PCC egress. At step 850, the PCECC sends a second PCLabelUpd message to the PCC transit. At step 860, the PCECC sends a third PCLabelUpd to the PCC ingress. The first, second, and third PCLabelUpd messages are similar to the PCLabelUpd message described in Zhao, but with extensions, as described more fully below. The first, second, and third PCLabelUpd messages inform the PCC egress, the PCC transit, and the PCC egress, respectively, of label information needed to route the data packet along the LSP, as described more fully below.

At step 870, the PCECC sends a path computation update (PCUpd) message to the PCC ingress to inform the PCC ingress that the LSP set-up is complete. The PCUpd message is described in the 'Zhao PCEP. As illustrated, the PCECC communicates directly with each PCC ingress, PCC transit, and PCC egress along the path of the LSP.

The PCLabelUpd message may comprise a PCEP common header and a PCE label update list object. The PCE label update list object comprises a list of PCE label update objects. Each PCE label update object comprises a PCE label download object or a PCE label map. The PCEP common header is described in Vasseur, et al., "Path Computation Element (PCE) Communication Protocol (PCEP)," IETF RFC 5440, March 2009, which is incorporated by reference. The PCE label update list object, the PCE label update object, and the PCE label download object are described in the 'Zhao PCEP. The PCE label map object is extended to provision for services such as the VPNs 351 and 352, the IPv6 tunnels 451 and 452, and the PWE3 or pseudowires 523 and 524, as described more fully below. The PCLabelUpd message comprises a list of message objects such as follows:

<PCLabelUpd Message>::=<Common Header>
    <pce-label-update-list>

```
<pce-label-update-list>::=<pce-label-update>
    [<pce-label-update-list>]
<pce-label-update>::=(<pce-label-download> or <pce-la-
    bel-map>).
```

The PCE label map object comprises a stateful request parameter (SRP) object, a label object, and a service object. The SRP object is described in Crabbe, et al., "PCEP Extensions for Stateful PCE," IETF draft, Mar. 20, 2016, which is incorporated by reference. The SRP object is used to correlate between update requests sent by a PCE and errors and states sent by a PCC. The label object is similar to the label object described in the Zhao. However, the label object is extended to include IPv6 addresses TLVs when operating in an IPv6 domain such as the domains 410, as described more fully below. The service object comprises a value or a name identifying a service. When the service is a VPN service, the service object comprises a VPN value and/or a VPN name. When the service is a PWE3 service, the service object comprises a DLCI value and/or a DLCI name. The format of a PCE label map object for VPN is as follows:

```
<pce-label-map>::=<SRP>
    <label>
    <VPN Number>[<VPN Name>].
```

The format of a PCE label map object for PWE3 is as follows:

```
<pce-label-map>::=<SRP>
    <label>
    <DLCI Number>[<DLCI Name>].
```

Figure 9:
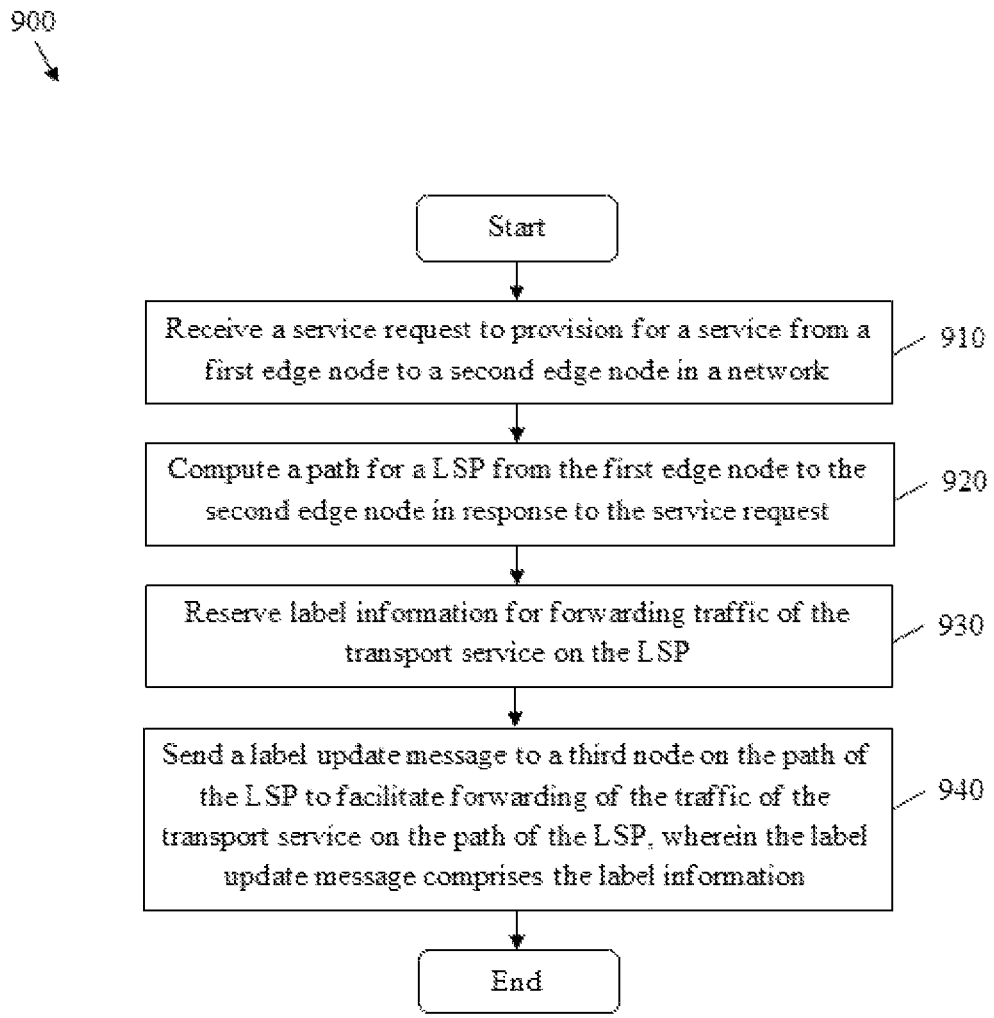
FIG. 9 is a flowchart of a method of provisioning a service according to an embodiment of the disclosure.

FIG. 9 is a flowchart of a method 900 of provisioning a service according to an embodiment of the disclosure. A PCECC similar to the PCECCs 360, 460, 560, and 710, a PCC ingress, a PCC transit, and a PCC egress similar to the nodes 320, 420, 521, and 730, and the NE 600 may implement the method 900. The method 900 employs similar mechanisms as described in the networks 300, 400, 500, and 700 and the method 800. The method 900 is implemented when the PCECC creates a service in a network such as the networks 300, 400, 500, and 700. At step 910, a service request to provision for a service from a first edge node to a second edge node in a network is received, for example, from a transport service orchestrator such as the transport service orchestrators 380, 480, and 580. The service may be a VPN service such as the VPNs 351 and 352, a PWE3 service such as the pseudowires 523 and 524, or an IPv6 tunneling service such as the IPv6 tunnels 451 and 452. For example, for the VPN 351, the first edge node is the node PE1 320, and the second edge node is the node PE2 320. At step 920, in response to the service request, a path is computed for an LSP from the first edge node to the second edge node, for example, using a CSPF component such as the CSPF component 716. The path may be computed according to topology information of the network, for example, stored in a TEDB such as the TEDBs 714, via a CSPF algorithm.

At step 930, label information is reserved for forwarding traffic of the transport service on the LSP, for example, from one or more LDBs such as the LDBs 711. The label information may include a path label for each node on the path of the LSP except for the ingress of the LSP and a service label for identifying the service. When the service is a VPN service, the service label is a VPN label, which may include a VPN number or a VPN name as described above. When the service is a PWE3 service, the service label is a DLCI label, which may include a DLCI number or a DLCI name as described above. When the service is an IPv6 tunneling service, the label information may include IPv6 addresses in an FEC object for identifying the service as described above.

At step 940, a label update message is sent to a third node on the path of the LSP to facilitate forwarding of the traffic of the transport service on the path of the LSP. The label update message comprises the label information. In an embodiment the label update message is a PCEP PCLabelUpd message comprising a PCE label map. The PCE label map may include a VPN label, a DLCI label, or an IPv6 FEC object depending on the service type.

Figure 10:
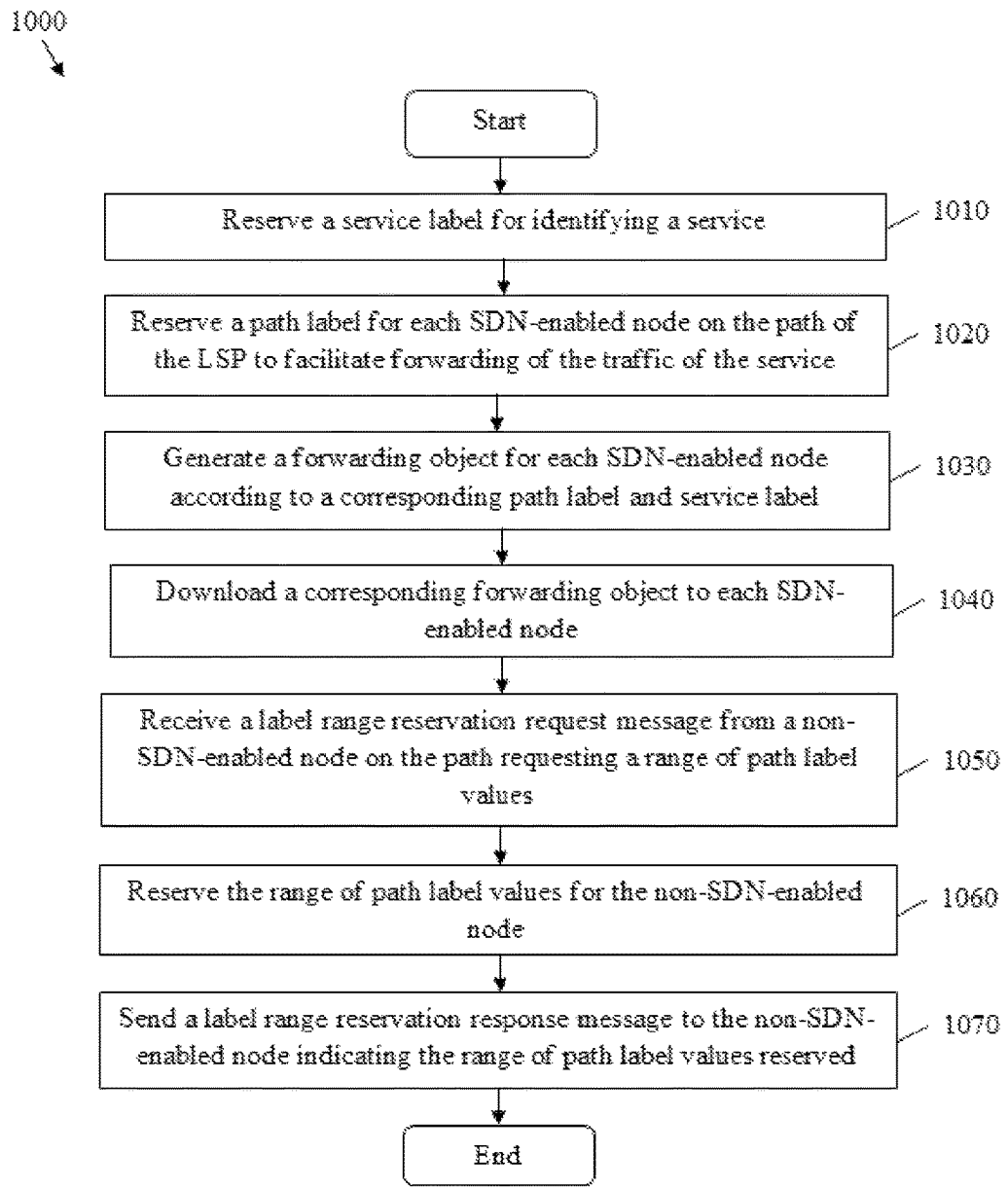
FIG. 10 is a flowchart of a method of provisioning a service according to another embodiment of the disclosure.

FIG. 10 is a flowchart of a method 1000 of provisioning a service according to another embodiment of the disclosure. A PCECC such as the PCECCs 360, 460, 560, 710 or the NE 600 may implement the method 1000. The method 1000 employs similar mechanisms as described in the networks 300, 400, 500, and 700 and the methods 800 and 900. The method 1000 is implemented when provisioning a service such as the VPNs 351 and 352, the PWE3s 551 and 552, and the IPv6 tunneling services 451 and 452 in a network such as the network 700 comprising both SDN-enabled nodes such as the nodes 320, 420, 521, and 730 and legacy nodes such as the nodes 120, 221, 222, and 720. The method 1000 is implemented after the PCECC computed a path for an LSP to serve the service. At step 1010, a service label is reserved for identifying a service, for example, from an LDB such as the LDBs 711. At step 1020, a path label is reserved for each SDN-enabled node on the path of the LSP to facilitate forwarding of the traffic of the service.

At step 1030, a forwarding object is generated for each SDN-enabled node according to a corresponding path label and a service label. For example, a forwarding object for an ingress of the LSP may include an instruction to attach the service label and the path label of a next hop node on the path. A forwarding object for a transit node of the LSP may include an instruction to swap an incoming path label with an outgoing path label, which is the path label of a next hop node on the path. A forwarding object for an egress of the LSP may include an instruction to remove a service label and an incoming path label before forwarding. At step 1040, a corresponding forwarding object is downloaded to each SDN-enabled node, for example, using a PCEP component such as the PCEP component 713.

At step 1050, a label range reservation request message is received from a non-SDN-enabled node on the path requesting a range of path label values. At step 1060, the range of path label values is reserved for the non-SDN-enabled node. The PCECC may reserve a subset of the path label values for the non-SDN-enabled node.

At step 1070, a label range reservation response message is sent to the non-SDN-enabled node indicating the range of path label values reserved. The PCECC may store the path label values reserved for the non-SDN-enabled node in an LDB such as the LDBs 711. The steps of 1050-1070 may be repeated to negotiate another range of path label values or for other non-SDN-enabled nodes on the path. The method 1000 may implement the steps in the order as shown or any other suitable order to achieve similar functionalities.

Figure 11:
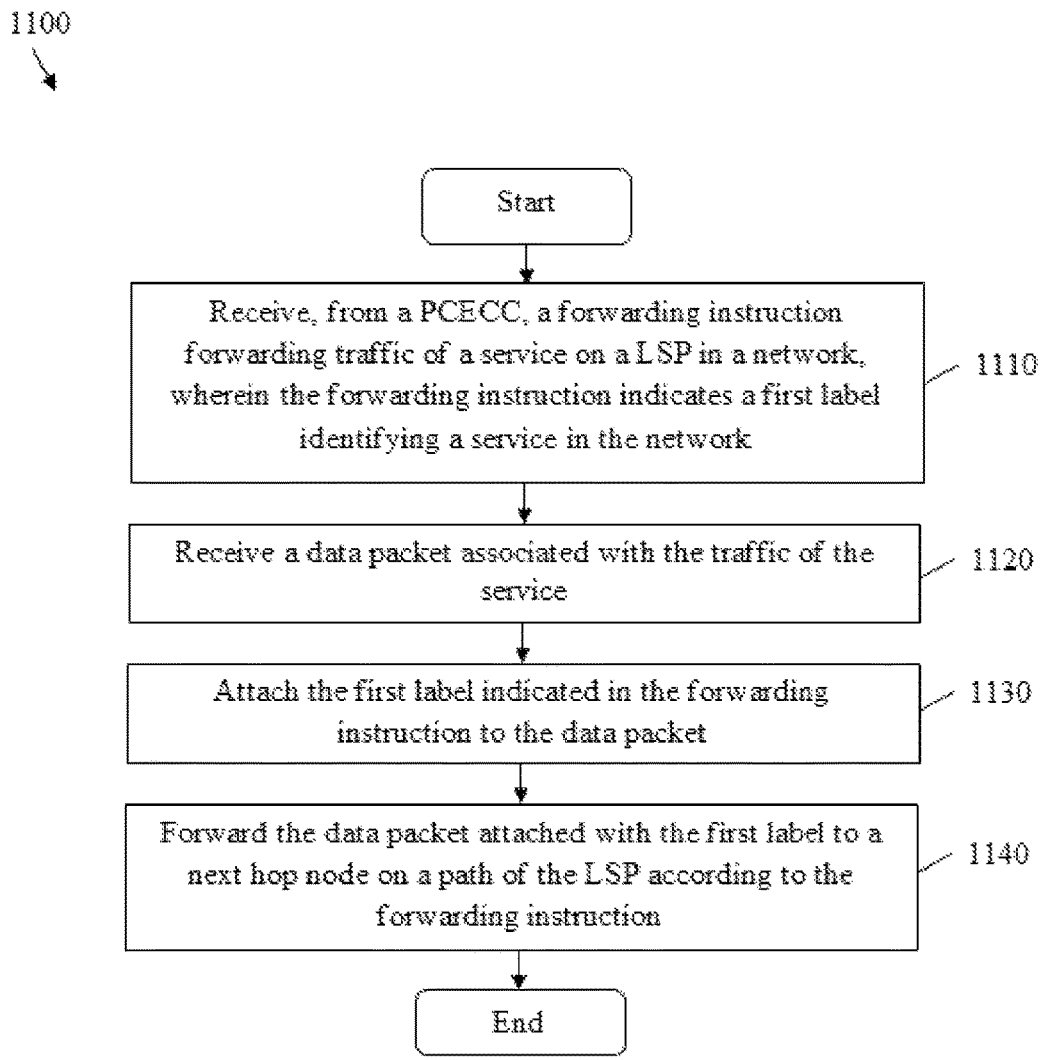
FIG. 11 is a flowchart of a method of performing data forwarding in a network according to an embodiment of the disclosure.

FIG. 11 is a flowchart of a method 1100 of performing data forwarding in a network such as the networks 300, 400, 500, and 700 according to an embodiment of the disclosure. A SDN-enabled node such as the nodes 320, 420, 521, and 730 or the NE 600 may implement the method 1100. The method 1100 begins when the SDN-enable node receives forwarding instructions.

At step 1110, a forwarding instruction forwarding traffic of a service on an LSP in a network is received from a PCECC such as the PCECCs 360, 460, 560, and 710. The forwarding instruction indicates a first label identifying a service in the network. At step 1120, a data packet associated with the traffic of the service is received.

At step 1130, the first label indicated in the forwarding instruction is attached to the data packet. At step 1140, the data packet attached with the first label is forwarded to a next hop node on a path of the LSP according to the forwarding instruction. The SDN-enabled node may store the received forwarding instruction in an FIB and may search for the forwarding instruction in the FIB when receiving the data packet.

Figure 12:
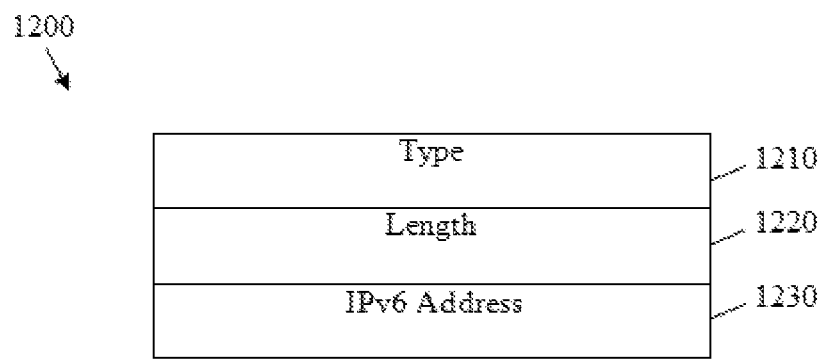
FIG. 12 is a schematic diagram of an IPv6 address type-length-value (TLV) according to an embodiment of the disclosure.

FIG. 12 is a schematic diagram of an IPv6 address TLV 1200 according to an embodiment of the disclosure. A PCECC such as the PCECCs 360, 460, 560, and 710 employs the TLV 1200 to associate next hop information with an outgoing label or associate an incoming interface with an incoming label. For example, a PCEP PCLabelUpd message, which is described in section 6.1.1 of Zhao, may include a label object with a TLV 1200. The TLV 1200 comprises a type field 1210, a length field 1220, and an IPv6 address field 1230. The type field 1210 is about two octets long and indicates that the TLV 1200 is an IPv6 address TLV. The length field 1220 is about two octets long and indicates a length of the IPv6 address field 1230. The IPv6 address field 1230 is about 16 bytes long and indicates an IPv6 address of a next hop node associated with an outgoing label. Alternatively, the IPv6 address field 1230 indicates an IPv6 address of an incoming interface associated with an incoming label.

Figure 13:
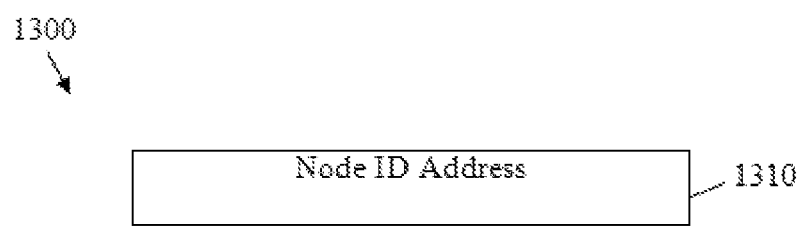
FIG. 13 is a schematic diagram of a forwarding equivalence class (FEC) object according to an embodiment of the disclosure.

FIG. 13 is a schematic diagram of an FEC object 1300 according to an embodiment of the disclosure. A PCECC such as the PCECCs 360, 460, 560, and 710 employs the FEC object 1300 to provide FEC information. For example, a PCEP PCLabelUpd message may include the FEC object 1300. The FEC object 1300 comprises a node ID address field 1310. The node ID address field 1310 is about 16 bytes long and indicates an IPv6 address associated with an FEC.

Figure 14:
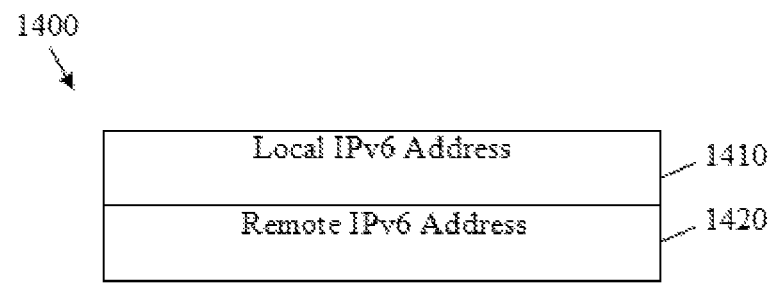
FIG. 14 is a schematic diagram of an FEC object according to another embodiment of the disclosure.

FIG. 14 is a schematic diagram of an FEC object 1400 according to another embodiment of the disclosure. A PCECC such as the PCECCs 360, 460, 560, and 710 employs the FEC object 1400 to provide FEC information. For example, a PCEP PCLabelUpd message may include the FEC object 1400. The FEC object 1400 comprises a local IPv6 address field 1410 and a remote IPv6 address field 1420 for an adjacency or a neighboring node. The local IPv6 address field 1410 and the remote IPv6 address field 1420 are each about 16 bytes long and each indicate an IPv6 address for the adjacency.

In an example embodiment, a path computation element centralized controller (PCECC) comprises: a receiving element configured to receive a request to create a service from a first edge node to a second edge node in a network; a processing element coupled to the receiving element and configured to: compute a path for a label switched path (LSP) from the first edge node to the second edge node in response to the request; and reserve label information for forwarding traffic of the service on the LSP; and a transmitting element coupled to the processing element and configured to send a label update message to a third node on the path to facilitate forwarding of the traffic of the service on the path, wherein the label update message comprises the label information While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a path computation element centralized controller (PCECC), the method comprising:
   receiving a service request to provision for a service from a first edge node and a second edge node in a network;
   computing a path for a label switched path (LSP) from the first edge node to the second edge node in response to the service request;
   reserving, in response to the computing, label information for forwarding traffic of the service on the LSP, wherein the label information comprises a path label for each of a plurality of nodes on the path except for an ingress node and comprises a service label identifying the service; and
   sending a label update message to a third node on the path to facilitate forwarding of the traffic of the service on the path,
   wherein the label update message comprises the label information.

2. The method of claim 1, wherein the service is a virtual private network (VPN) service, and wherein the service label is a VPN label for identifying the VPN service in the network.

3. The method of claim 2, wherein the VPN label comprises a VPN number, a VPN name, or both the VPN number and the VPN name.

4. The method of claim 1, wherein the service is a pseudowire emulation edge-to-edge (PWE3) service, and wherein the service label is a data link layer connection identifier (DLCI) label for identifying the PWE3 service in the network.

5. The method of claim 4, wherein the DLCI label comprises a DLCI number, a DLCI name, or both the DLCI number and the DLCI name.

6. The method of claim 1, wherein the service is an Internet Protocol version 6 (IPv6) tunneling service, and wherein the service label is an IPv6 address type-length-value (TLV) indicating an IPv6 address associated with a next hop node of the third node on the path and an outgoing label for forwarding the traffic of the service to the next hop node.

7. The method of claim 1, wherein the service is an Internet Protocol version 6 (IPv6) tunneling service, and wherein the service label is an IPv6 address type-length-value (TLV) indicating an IPv6 address associated with an incoming interface of the third node and an incoming label associated with the incoming interface.

8. The method of claim 1, wherein the nodes are SDN-enabled nodes, and wherein the third node is one of the SDN-enabled nodes.

9. The method of claim 1, further comprising:
receiving, from a non-SDN-enabled node on the path, a label range reservation request message requesting a range of path label values;
reserving the range for the non-SDN-enabled node; and
sending, to the non-SDN-enabled node, a label range reservation response message indicating the range of path label values reserved.

10. The method of claim 1, wherein the label update message is a path computation element communication (PCE) communication protocol (PCEP) label update (PCLabelUp) message.

11. A path computation element centralized controller (PCECC) comprising:
a receiver configured to receive a request to create a service from a first edge node to a second edge node in a network;
a processor coupled to the receiver and configured to:
compute a path for a label switched path (LSP) from the first edge node to the second edge node in response to the request; and
reserve, in response to the computing, label information for forwarding traffic of the service on the LSP, wherein the label information comprises a path label for each of a plurality of nodes on the path except for an ingress node and comprises a service label identifying the service; and
a transmitter coupled to the processor and configured to send a label update message to a third node on the path to facilitate forwarding of the traffic of the service on the path,
wherein the label update message comprises the label information.

12. The PCECC of claim 11, wherein the service is a virtual private network (VPN) service, and wherein the service label is a VPN label for identifying the VPN service in the network.

13. The PCECC of claim 11, wherein the service is a pseudowire emulation edge-to-edge (PWE3) service, and wherein the service label is a data link layer connection identifier (DLCI) label for identifying the PWE3 service in the network.

14. The PCECC of claim 11, wherein the service is an Internet Protocol version 6 (IPv6) tunneling service, and wherein the label update message further comprises an IPv6 address of an egress node of the LSP.

15. The PCECC of claim 11, further comprising a memory coupled to the processor and configured to store a traffic engineering database (TEDB) comprising topology information of the network, wherein the processor is further configured to compute the path according to the topology information in the TEDB.

16. The PCECC of claim 11, further comprising a memory coupled to the processor and configured to store a label database (LDB) comprising service labels for identifying services in the network, wherein the processor is further configured to reserve the label information from the LDB.

17. The PCECC of claim 11, further comprising a memory coupled to the processor and configured to store an LSP database (LSPDB), wherein the processor is further configured to store path information associated with the LSP in the LSPDB, and wherein the path information comprises the label information.

18. A network element (NE) comprising:
a receiver configured to:
receive, from a path computation element centralized controller (PCECC), a forwarding instruction for forwarding traffic of a service on a label switched path (LSP) in a network, wherein the forwarding instruction indicates a first label identifying the service in the network; and
receive a data packet associated with the traffic;
a processor coupled to the receiver and configured to attach the first label to the data packet; and
a transmitter coupled to the processor and configured to forward the data packet to a next hop node on a path of the LSP according to the forwarding instruction.

19. The NE of claim 18, wherein the service is a virtual private network (VPN) service, a pseudowire emulation edge-to-edge (PWE3) service, or an Internet Protocol version 6 (IPv6) tunneling service.

20. The NE of claim 18, wherein the NE is independent of any label distribution protocol (LDP) signaling or resource reservation protocol-traffic engineering (RSVP-TE) multiprotocol label switching (MPLS) signaling.

21. A system comprising:
a path computation element centralized controller (PCECC) configured to:
compute a path for a label switched path (LSP) from a first edge node to a second edge node;
reserve, in response to the computing, label information for forwarding traffic of a service on the LSP, wherein the label information comprises a path label for each of a plurality of nodes on the path except for an ingress node and comprises a service label identifying the service;
transmit a label update message comprising the label information;
a network element (NE) located on the path and configured to:
receive the label update message from the PCECC;
receive a data packet associated with the traffic;
attach the label information to the data packet; and
transmit the data packet to a next hop node on the path according to the label update message.

* * * * *

UNITED STATES PATENT AND TRADEMARK OFFICE
CERTIFICATE OF CORRECTION

PATENT NO. : 10,412,019 B2
APPLICATION NO. : 15/201195
DATED : September 10, 2019
INVENTOR(S) : Qianglin Quintin Zhao et al.

It is certified that error appears in the above-identified patent and that said Letters Patent is hereby corrected as shown below:

In the Claims

Column 18, Lines 22-39, Claim 1 should read:
1. A method implemented by a path computation element centralized controller (PCECC), the method comprising:
   receiving a service request to provision for a service from a first edge node to a second edge node in a network;
   computing a path for a point-to-point label switched path (LSP) from the first edge node to the second edge node in response to the service request;
   reserving, in response to the computing, label information for forwarding traffic of the service on the point-to-point LSP, wherein the label information comprises a path label for each of a plurality of nodes on the path except for an ingress node and comprises a service label identifying the service; and
   sending a label update message to a third node on the path to facilitate forwarding of the traffic of the service on the path,
   wherein the label update message comprises the label information.

Column 19, Lines 1-3, Claim 8, should read:
8. The method of claim 1, wherein the nodes are software-defined networking (SDN)-enabled nodes, and wherein the third node is one of the SDN-enabled nodes.

Column 19, Lines 4-11, Claim 9, should read:
9. The method of claim 1, further comprising:
   receiving, from a non-software-defined networking (SDN)-enabled node on the path, a label range reservation request message requesting a range of path label values;
   reserving the range for the non-SDN-enabled node; and
   sending, to the non-SDN-enabled node, a label range reservation response message indicating the range of path label values reserved.

Signed and Sealed this
Twenty-ninth Day of October, 2019

Andrei Iancu
*Director of the United States Patent and Trademark Office*

CERTIFICATE OF CORRECTION (continued)
U.S. Pat. No. 10,412,019 B2

Column 19, Lines 16-36, Claim 11, should read:
11. A path computation element centralized controller (PCECC) comprising:
 a receiver configured to receive a request to create a service from a first edge node to a second edge node in a network;
 a processor coupled to the receiver and configured to:
  compute a path for a point-to-point label switched path (LSP) from the first edge node to the second edge node in response to the request; and
  reserve, in response to the computing, label information for forwarding traffic of the service on the point-to-point LSP, wherein the label information comprises a path label for each of a plurality of nodes on the path except for an ingress node and comprises a service label identifying the service; and
 a transmitter coupled to the processor and configured to send a label update message to a third node on the path to facilitate forwarding of the traffic of the service on the path,
 wherein the label update message comprises the label information.

Column 19, Lines 46-49, Claim 14, should read:
14. The PCECC of claim 11, wherein the service is an Internet Protocol version 6 (IPv6) tunneling service, and wherein the label update message further comprises an IPv6 address of an egress node of the point-to-point LSP.

Column 20, Lines 6-11, Claim 17, should read:
17. The PCECC of claim 11, further comprising a memory coupled to the processor and configured to store an LSP database (LSPDB), wherein the processor is further configured to store path information associated with the point-to-point LSP in the LSPDB, and wherein the path information comprises the label information.

Column 20, Lines 12-25, Claim 18, should read:
18. A network element (NE) comprising:
 a receiver configured to:
  receive, from a path computation element centralized controller (PCECC), a forwarding instruction for forwarding traffic of a service on a point-to-point label switched path (LSP) from a first edge node to a second edge node in a network, wherein the forwarding instruction indicates a first label identifying the service in the network; and
  receive a data packet associated with the traffic;
 a processor coupled to the receiver and configured to attach the first label to the data packet; and
 a transmitter coupled to the processor and configured to forward the data packet to a next hop node on a path of the point-to-point LSP according to the forwarding instruction.

Column 20, Lines 34-53, Claim 21, should read:
21. A system comprising:
 a path computation element centralized controller (PCECC) configured to:
  compute a path for a point-to-point label switched path (LSP) from a first edge node to a second edge node;
  reserve, in response to the computing, label information for forwarding traffic of a service on the point-to-point LSP, wherein the label information comprises a path label for each of a plurality of nodes on the path except for an ingress node and comprises a service label identifying the service;
        transmit a label update message comprising the label information;
    a network element (NE) located on the path and configured to:
        receive the label update message from the PCECC;
        receive a data packet associated with the traffic;
attach the label information to the data packet; and
        transmit the data packet to a next hop node on the path according to the label update message.